(12) United States Patent
Al Sharnouby et al.

(10) Patent No.: US 12,593,023 B2
(45) Date of Patent: Mar. 31, 2026

(54) ELECTRONIC DEVICE WITH RELIABLE PASSTHROUGH VIDEO FALLBACK CAPABILITY AND HIERARCHICAL FAILURE DETECTION SCHEME

(71) Applicant: Apple Inc., Cupertino, CA (US)

(72) Inventors: Mohamed Al Sharnouby, Dublin, CA (US); Arun Kannan, Mountain View, CA (US); Venu M Duggineni, San Jose, CA (US); Kaushik Raghunath, Pleasanton, CA (US); Saul H Weiss, Parker, CO (US); Luke Yoder, Poulsbo, WA (US); James C McIlree, Santa Clara, CA (US); Sankaravadivoo Subramanian, Saratoga, CA (US); Mukta S Gore, Sunnyvale, CA (US); Russell L Jones, Westminster, CO (US)

(73) Assignee: Apple Inc., Cupertino, CA (US)

( * ) Notice: Subject to any disclaimer, the term of this patent is extended or adjusted under 35 U.S.C. 154(b) by 207 days.

(21) Appl. No.: 18/530,642

(22) Filed: Dec. 6, 2023

(65) Prior Publication Data

US 2024/0323342 A1 Sep. 26, 2024

Related U.S. Application Data

(60) Provisional application No. 63/491,475, filed on Mar. 21, 2023.

(51) Int. Cl.
H04N 13/383 (2018.01)
G06F 3/01 (2006.01)
H04N 13/106 (2018.01)

(52) U.S. Cl.
CPC ........... *H04N 13/383* (2018.05); *G06F 3/013* (2013.01); *H04N 13/158* (2018.05)

(58) Field of Classification Search
None
See application file for complete search history.

(56) References Cited

U.S. PATENT DOCUMENTS 7,788,568 B1 * 8/2010 Huang .................. H03M 13/01
709/224
8,392,695 B1 3/2013 Lachwani et al.
(Continued)

FOREIGN PATENT DOCUMENTS

WO 2022067001 A1 3/2022
WO 2023049287 A1 3/2023

*Primary Examiner* — Talha M Nawaz
(74) *Attorney, Agent, or Firm* — Treyz Law Group; Jason Tsai

(57) ABSTRACT

An electronic device is provided that includes at least one image sensor for acquiring a video feed and one or more displays for presenting a passthrough video feed to a user. The electronic device can include a hierarchical failure detection scheme for detecting critical failures on the device. The hierarchical failure detection scheme may include monitoring a condition of a first subsystem with a second subsystem, monitoring a condition of the second subsystem with a third subsystem, monitoring a condition of the third subsystem with a fourth subsystem, and so on. The displays can operate in a first video passthrough mode or a second video passthrough mode based on the condition of the first subsystem as monitored by the second subsystem, the condition of the second subsystem as monitored by the third subsystem, and/or the condition of the third subsystem as monitored by the fourth subsystem.

27 Claims, 9 Drawing Sheets

(56)                    References Cited

U.S. PATENT DOCUMENTS

| | | | |
|---|---|---|---|
| 9,741,169 | B1 | 8/2017 | Holz |
| 10,203,762 | B2 * | 2/2019 | Bradski ................ H04N 21/414 |
| 11,252,445 | B1 * | 2/2022 | Chen ............... H04N 21/23418 |
| 11,676,329 | B1 | 6/2023 | Ma et al. |
| 11,720,171 | B2 | 8/2023 | Pastrana Vicente et al. |
| 2012/0249416 | A1 | 10/2012 | Maciocci et al. |
| 2019/0064522 | A1 | 2/2019 | Reif |
| 2019/0158795 | A1 | 5/2019 | Chun et al. |
| 2019/0208181 | A1 | 7/2019 | Rowell et al. |
| 2019/0387168 | A1 | 12/2019 | Smith et al. |
| 2019/0391724 | A1 * | 12/2019 | Holz .................... G06F 3/0304 |
| 2020/0098097 | A1 | 3/2020 | Rodriguez et al. |
| 2020/0336719 | A1 | 10/2020 | Morisawa et al. |
| 2022/0197382 | A1 * | 6/2022 | LeBeau ................ G06F 3/0304 |
| 2022/0292790 | A1 | 9/2022 | Lohr et al. |
| 2023/0144091 | A1 | 5/2023 | Forutanpour et al. |
| 2023/0161613 | A1 | 5/2023 | Rajendran et al. |

* cited by examiner

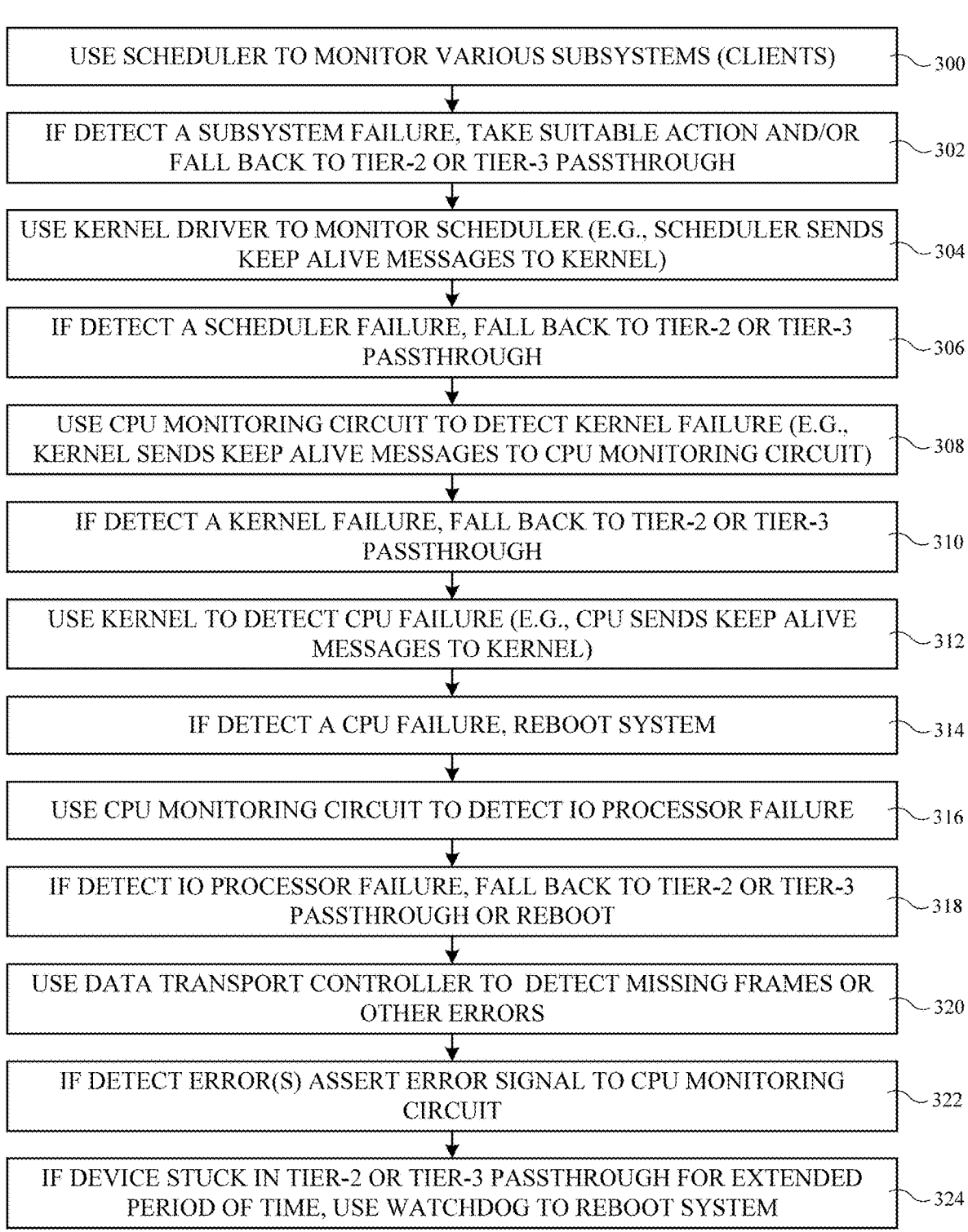

USE SCHEDULER TO MONITOR VARIOUS SUBSYSTEMS (CLIENTS) — 300

IF DETECT A SUBSYSTEM FAILURE, TAKE SUITABLE ACTION AND/OR FALL BACK TO TIER-2 OR TIER-3 PASSTHROUGH — 302

USE KERNEL DRIVER TO MONITOR SCHEDULER (E.G., SCHEDULER SENDS KEEP ALIVE MESSAGES TO KERNEL) — 304

IF DETECT A SCHEDULER FAILURE, FALL BACK TO TIER-2 OR TIER-3 PASSTHROUGH — 306

USE CPU MONITORING CIRCUIT TO DETECT KERNEL FAILURE (E.G., KERNEL SENDS KEEP ALIVE MESSAGES TO CPU MONITORING CIRCUIT) — 308

IF DETECT A KERNEL FAILURE, FALL BACK TO TIER-2 OR TIER-3 PASSTHROUGH — 310

USE KERNEL TO DETECT CPU FAILURE (E.G., CPU SENDS KEEP ALIVE MESSAGES TO KERNEL) — 312

IF DETECT A CPU FAILURE, REBOOT SYSTEM — 314

USE CPU MONITORING CIRCUIT TO DETECT IO PROCESSOR FAILURE — 316

IF DETECT IO PROCESSOR FAILURE, FALL BACK TO TIER-2 OR TIER-3 PASSTHROUGH OR REBOOT — 318

USE DATA TRANSPORT CONTROLLER TO DETECT MISSING FRAMES OR OTHER ERRORS — 320

IF DETECT ERROR(S) ASSERT ERROR SIGNAL TO CPU MONITORING CIRCUIT — 322

IF DEVICE STUCK IN TIER-2 OR TIER-3 PASSTHROUGH FOR EXTENDED PERIOD OF TIME, USE WATCHDOG TO REBOOT SYSTEM — 324

*FIG. 8*

ELECTRONIC DEVICE WITH RELIABLE PASSTHROUGH VIDEO FALLBACK CAPABILITY AND HIERARCHICAL FAILURE DETECTION SCHEME

This application claims the benefit of U.S. Provisional Patent Application No. 63/491,475, filed Mar. 21, 2023, which is hereby incorporated by reference herein in its entirety.

FIELD

This relates generally to electronic devices, and, more particularly, to electronic devices such as head-mounted devices.

BACKGROUND

Electronic devices such as head-mounted devices may have cameras for capturing a video feed of an external environment and one or more displays for presenting the captured video feed to a user. Head-mounted devices can include hardware or software subsystems for processing the video feed, such as hardware/software subsystems for performing gaze tracking, hands gesture tracking, or rendering of virtual content on top of the real-world content in the video feed.

It can be challenging to design a head-mounted device in which the user is presented with such passthrough video feed. When one or more of these subsystems crash, the head-mounted device can simply restart the failing components. Restarting applications when a system failure or crash occurs can be problematic, especially when the user is relying on the passthrough video feed to navigate the external environment. If care is not taken, the visual quality of the video feed can also degrade, resulting in visual discomfort for the user.

SUMMARY

An electronic device such as a head-mounted device may include one or more cameras for capturing a video feed of a real-world environment and one or more displays for presenting a passthrough video feed to a user. The electronic device may include processing circuitry for performing one or more processing functions on the captured video feed to generate the passthrough video feed. The processing circuitry can include dedicated compute blocks such as an image signal processor and can also include auxiliary compute blocks for performing application-level functions on the video feed. The electronic device can be operable in multiple video passthrough modes depending on whether one or more processing blocks in the processing circuit is failing or is otherwise operating in an unreliable manner. For instance, switching from a full-featured video passthrough mode to a relatively simpler video passthrough mode that is more reliable can help improve a user's visual comfort and awareness of his or her surroundings.

An aspect of the disclosure provides a method of operating an electronic device that includes using at least one image sensor to acquire a video feed, using a scheduler running in an application layer of the electronic device to receive compute graphs from a plurality of applications running in the application layer, using the scheduler to analyze the compute graphs to identify a condition of the applications, and determining whether to operate the electronic device in a first video passthrough mode or a second video passthrough mode based on the identified condition of the applications. Operating in the first video passthrough mode can include displaying a passthrough video feed by modifying the video feed using information from the applications, whereas operating in the second video passthrough mode can include displaying a passthrough video feed without modifying the video feed using the information from the applications. The first video passthrough mode can be a tier-1 full-featured passthrough mode, whereas the second video passthrough mode can be a tier-2 high quality passthrough mode or a tier-3 simple passthrough mode.

The applications can include a gaze tracking application configured to execute a gaze tracking algorithm that tracks a user's gaze, and the scheduler can be configured to detect a failure of the gaze tracking algorithm by monitoring an output of a node in a compute graph associated with the gaze tracking algorithm. The applications can include a head pose tracking application configured to execute a head pose tracking algorithm that tracks a user's head pose, and the scheduler can be configured to detect a failure of the head pose tracking algorithm by monitoring an output of a node in a compute graph associated with the head pose tracking algorithm. The applications can include a virtual content compositor configured to execute a virtual content compositor algorithm that generates composited virtual frames based on user tracking data, and the scheduler can be configured to detect a failure of the virtual content compositor algorithm by monitoring an output of a node in a compute graph associated with the virtual content compositor algorithm. The applications can include a graphics rendering application configured to execute a graphics rendering algorithm that generates virtual content, and the scheduler can be configured to detect a failure of the graphics rendering algorithm by monitoring an output of a node in a compute graph associated with the graphics rendering algorithm. The applications can include applications configured to generate extended reality content, where failure of such applications can trigger a configurable corrective action to mitigate that failure.

A hierarchical failure detection scheme can be implemented. The method can further include using a kernel driver running in a kernel layer of the electronic device to receive keep alive messages from the scheduler and optionally switching the electronic device between the first video passthrough mode and the second video passthrough mode in response to the kernel driver not receiving any keep alive messages from the scheduler for a period of time exceeding a threshold. The method can further include using a central processing unit (CPU) in the electronic device to receive keep alive messages from the kernel driver and, in response to the CPU not receiving any keep alive messages from the kernel driver for a period of time exceeding a threshold or in response to the CPU receiving a kernel panic signal from the kernel driver, switching the electronic device between the first video passthrough mode and the second video passthrough mode. The method can further include using the kernel driver to receive keep alive messages from the CPU and, in response to the kernel driver not receiving any keep alive messages from the CPU for a period of time exceeding a threshold or in response to the kernel driver receiving a panic signal from the CPU, rebooting the electronic device. The method can further include using the CPU to receive keep alive messages from at least one input-output processor in the electronic device and, in response to the CPU not receiving any keep alive messages from the at least one input-output processor for a period of time exceeding a threshold or in response to the CPU receiving a panic signal from the at least one input-output processor, switching the electronic device between the first video passthrough mode and the second video passthrough mode. The method can further include using a first data transport controller to transmit video frames to a second data transport controller and, in response to the second data transport controller detecting an error in the transmitted video frames, asserting an error signal to alert the CPU.

An aspect of the disclosure provides a method of operating an electronic device that includes using at least one image sensor to acquire or capture a video feed, monitoring a condition of a first subsystem using a second subsystem, determining whether to operate the electronic device in a first video passthrough mode or a second video passthrough mode based on the condition of the first subsystem as monitored by the second subsystem, monitoring a condition of the second subsystem using a third subsystem, and determining whether to operate the electronic device in the first video passthrough mode or the second video passthrough mode based on the condition of the second subsystem as monitored by the third subsystem. Operating in the first video passthrough mode can entail displaying a passthrough video feed by using processing circuitry to perform a processing function on the video feed from the at least one image sensor, whereas operating in the second video passthrough mode can entail displaying a passthrough video feed based on the video feed from the at least one image sensor without performing the processing function. The method can further include monitoring a condition of the third subsystem using a fourth subsystem and determining whether to operate the electronic device in the first video passthrough mode or the second video passthrough mode based on the condition of the third subsystem as monitored by the fourth subsystem.

An aspect of the disclosure provides an electronic device that can include at least one image sensor configured to acquire a video feed, a first subsystem, a second subsystem configured to monitor a condition of the first subsystem, a third subsystem configured to monitor a condition of the second subsystem, and one or more displays configured to operate in a first video passthrough mode or a second video passthrough mode based on the condition of the first subsystem as monitored by the second subsystem and based on the condition of the second subsystem as monitored by the third subsystem. In the first video passthrough mode, the one or more displays is configured to output a passthrough video feed by using processing circuitry to perform a processing function on the video feed from the at least one image sensor. In the second video passthrough mode, the one or more displays is configured to output a passthrough video feed based on the video feed from the at least one image sensor without performing the processing function.

BRIEF DESCRIPTION OF THE DRAWINGS

FIG. 8 is a flow chart of illustrative steps for operating the components of FIG. 7 to perform a hierarchical failure detection scheme in accordance with some embodiments.

DETAILED DESCRIPTION

An electronic device such as a head-mounted device may have a front face that faces away from a user's head and may have an opposing rear face that faces the user's head. One or more cameras on the front face of the device may be used to capture a live passthrough video stream of the external real-world environment. One or more displays on the rear face of the device may be used to present the live passthrough video stream to a user's eyes.

The head-mounted device may include dedicated computation blocks for performing basic processing on the passthrough video stream and may also include auxiliary computation blocks (sometimes referred to as application-level subsystems) for selectively performing more complex or advanced processing on the passthrough video stream. The dedicated computation blocks can provide basic image signal processing functions, whereas the auxiliary computation blocks can provide extensible video processing functions such as gaze tracking (or tracking of other body parts), point of view correction, rendering of virtual content, dynamic foveation, distortion compensation, etc.

Figure 1:
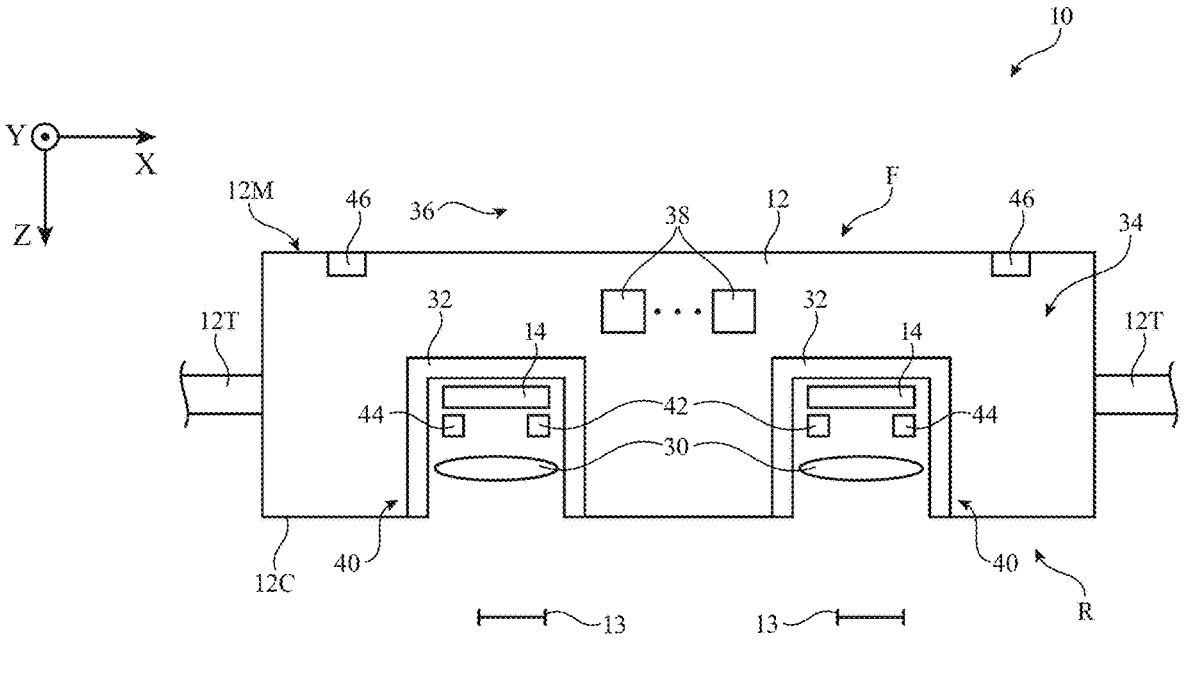
FIG. 1 is a top view of an illustrative head-mounted device in accordance with some embodiments.

During operation, some of the functions associated with the auxiliary computation blocks can crash or fail, resulting in a system failure or other instability in the passthrough video feed. To protect the user's visual comfort and awareness of his or her surroundings, in response to detecting a condition of the processing circuitry such detecting a system failure or instability, the head-mounted device can automatically switch or fall back on a reliable (or stable) passthrough video feed that only relies on the dedicated compute blocks (while bypassing, deactivating, or using default/fallback settings for the auxiliary computation blocks) or that only relies on functional compute blocks (while bypassing, deactivating, or using default settings for any failing computation blocks). The failure or instability detection scheme can rely on detecting a kernel panic signal or expiration of a watchdog timer, self-reporting from the auxiliary compute blocks, active monitoring of system parameters, and/or detection of other suitable condition to infer when one or more auxiliary compute blocks might have crashed. By falling back to a more reliable passthrough video feed in this way, the head-mounted device can avoid restarting the system when a crash occurs while minimizing visual discomfort for the user. A top view of an illustrative head-mounted device is shown in FIG. 1. As shown in FIG. 1, head-mounted devices such as electronic device 10 may have head-mounted support structures such as housing 12. Housing 12 may include portions (e.g., head-mounted support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., a head-mounted housing such as main housing portion 12M) of housing 12 may support electronic components such as displays 14.

Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures, and these rigid walls may optionally be covered with electrical components, fabric, leather, or other soft materials, etc. Housing portion 12M may also have internal support structures such as a frame (chassis) and/or structures that perform multiple functions such as controlling airflow and dissipating heat while providing structural support.

The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, spectacles, a hat, a mask, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a user.

Device 10 may have one or more cameras such as cameras 46 of FIG. 1. Cameras 46 that are mounted on front face F and that face outwardly (towards the front of device 10 and away from the user) may sometimes be referred to herein as forward-facing or front-facing cameras. Cameras 46 may capture visual odometry information, image information that is processed to locate objects in the user's field of view (e.g., so that virtual content can be registered appropriately relative to real-world objects), image content that is displayed in real time for a user of device 10, and/or other suitable image data. For example, forward-facing (front-facing) cameras may allow device 10 to monitor movement of the device 10 relative to the environment surrounding device 10 (e.g., the cameras may be used in forming a visual odometry system or part of a visual inertial odometry system). Forward-facing cameras may also be used to capture images of the environment that are displayed to a user of the device 10. If desired, images from multiple forward-facing cameras may be merged with each other and/or forward-facing camera content can be merged with computer-generated content for a user.

Device 10 may have any suitable number of cameras 46. For example, device 10 may have K cameras, where the value of K is at least one, at least two, at least four, at least six, at least eight, at least ten, at least 12, less than 20, less than 14, less than 12, less than 10, 4-10, or other suitable value. Cameras 46 may be sensitive at infrared wavelengths (e.g., cameras 46 may be infrared cameras), may be sensitive at visible wavelengths (e.g., cameras 46 may be visible cameras), and/or cameras 46 may be sensitive at other wavelengths. If desired, cameras 46 may be sensitive at both visible and infrared wavelengths.

Device 10 may have left and right optical modules 40. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14, lens 30, and support structure such as support structure 32. Support structure 32, which may sometimes be referred to as a lens support structure, optical component support structure, optical module support structure, or optical module portion, or lens barrel, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eyes boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light-emitting diodes 44 or other light-emitting devices such as lasers, lamps, etc. Cameras 42 and light-emitting diodes 44 may operate at any suitable wavelengths (visible, infrared, and/or ultraviolet). As an example, diodes 44 may emit infrared light that is invisible (or nearly invisible) to the user. This allows eye monitoring operations to be performed continuously without interfering with the user's ability to view images on displays 14.

Figure 2:
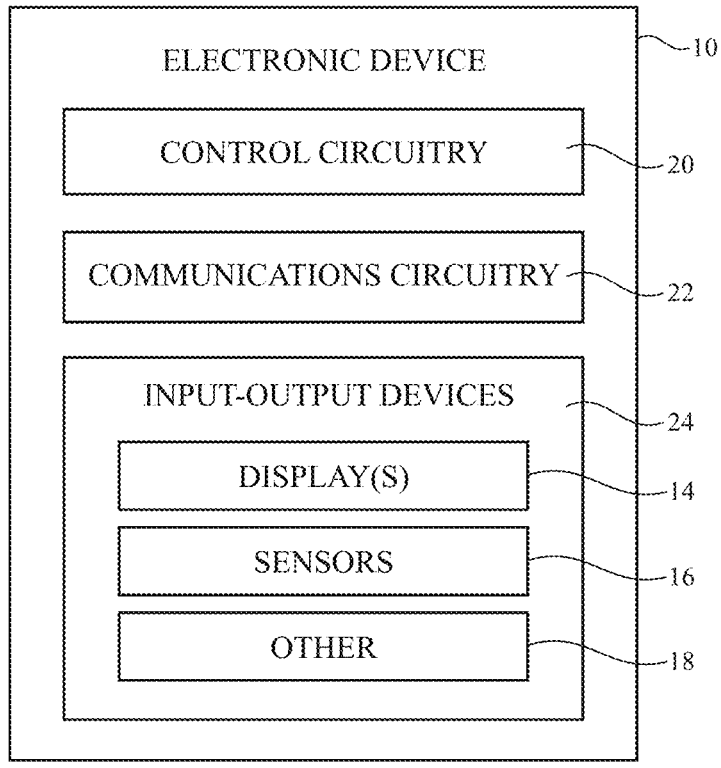
FIG. 2 is a schematic diagram of an illustrative head-mounted device in accordance with some embodiments.

A schematic diagram of an illustrative electronic device such as a head-mounted device or other wearable device is shown in FIG. 2. Device 10 of FIG. 2 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 2.

As shown in FIG. 2, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. One or more processors in control circuitry 20 may be used to gather input from sensors and other input devices and may be used to control output devices. The processing circuitry may be based on one or more processors such as microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output. Control circuitry 20 may be configured to perform operations in device 10 using hardware (e.g., dedicated hardware or circuitry), firmware, and/or software. Software code for performing operations in device 10 may be stored on storage circuitry (e.g., non-transitory (tangible) computer readable storage media that stores the software code). The software code may sometimes be referred to as program instructions, software, data, instructions, or code. The stored software code may be executed by the processing circuitry within circuitry 20.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device or a controller, computer stylus, or other input device, speakers or other output devices, etc.) over a wireless link.

For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors (e.g., cameras), fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion of device 10 and/or information about a pose of a user's head (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, three-dimensional camera systems such as depth sensors (e.g., structured light sensors and/or depth sensors based on stereo imaging devices that capture three-dimensional images) and/or optical sensors such as self-mixing sensors and light detection and ranging (lidar) sensors that gather time-of-flight measurements (e.g., time-of-flight cameras), humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Display(s) 14 can be used to present a variety of content to a user's eye. The left and right displays 14 that are used to present a fused stereoscopic image to the user's eyes when viewing through eye boxes 13 can sometimes be referred to collectively as a display 14. As an example, virtual reality (VR) content can be presented by display 14. Virtual reality content may refer to content that only includes virtual objects within a virtual reality (computer-generated) environment. As another example, mixed reality (MR) content can be presented by display 14. Mixed reality content may refer to content that includes virtual objects and real objects from the real-world physical environment in which device 10 is being operated. As another example, only real-world content can be presented by display 14. The real-world content may refer to images being captured by one or more front-facing cameras (see, e.g., cameras 46 in FIG. 1) and passed through as a live feed to the user. The real-world content being captured by the front-facing cameras is therefore sometimes referred to as a camera passthrough feed, a (live) video passthrough feed, or a passthrough video feed (stream).

Figure 3:
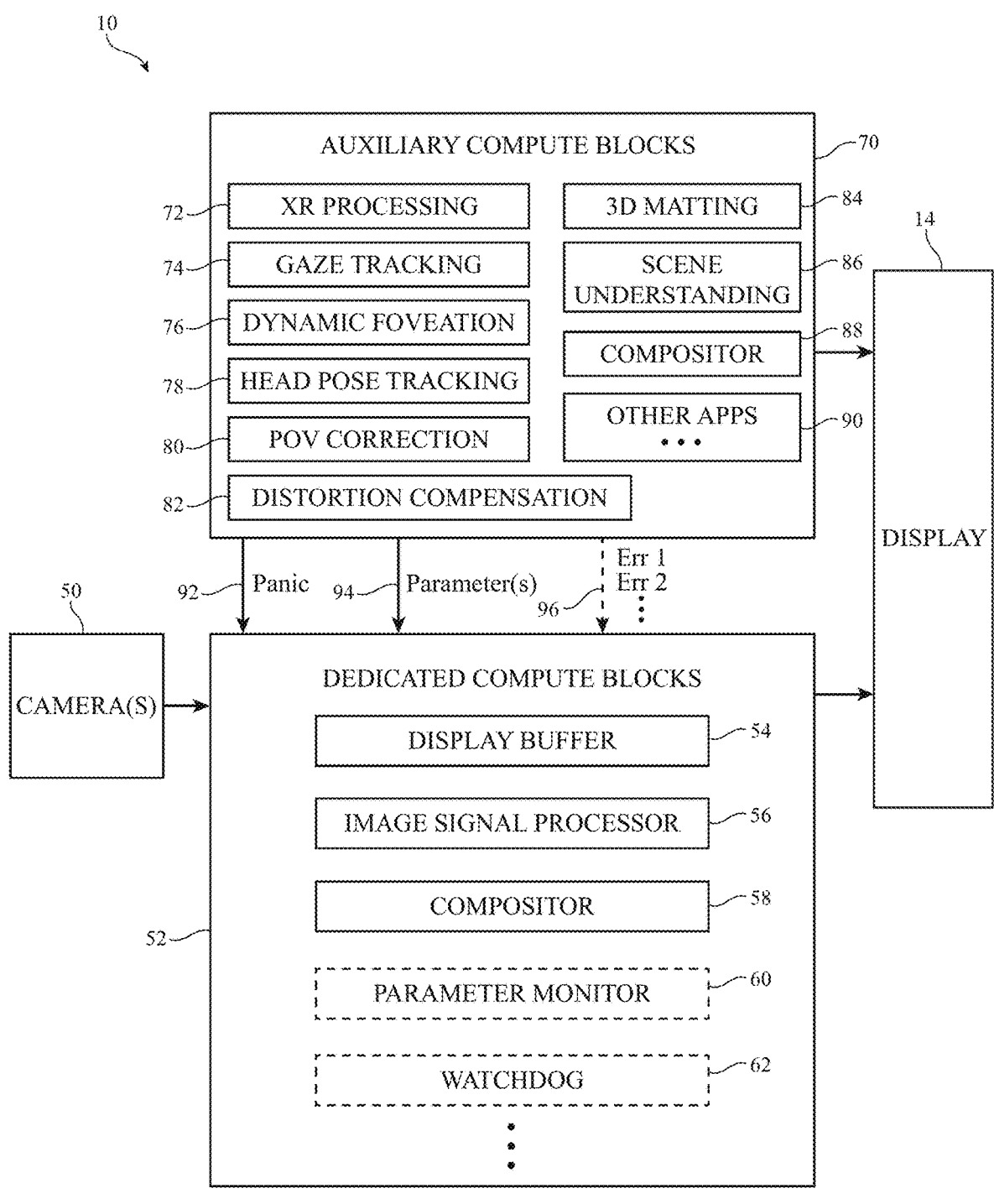
FIG. 3 is a diagram showing illustrative dedicated compute blocks and auxiliary compute blocks configured to process a passthrough video stream in accordance with some embodiments.

FIG. 3 is a diagram showing how the passthrough video feed captured by the front-facing cameras in device 10 can be processed using one or more computation (compute) blocks before being output by display 14. As shown in FIG. 3, one or more cameras 50 may capture and output a passthrough video feed to dedicated compute blocks 52. Camera(s) 50 may represent front-facing camera(s) 46 and/ or other cameras that can be used to capture images of the external real-world environment surrounding device 10. The video feed output from camera 50 can sometimes be referred to as the raw video feed. The dedicated compute blocks 52 may include hardware and/or software blocks (subsystems) configured to perform basic image signal processing on the raw video feed to generate a processed passthrough video feed.

Dedicated compute blocks 52 may include a display buffer 54 configured to store or buffer the passthrough video feed while it is being processing by the various compute blocks within device 10. Dedicated compute blocks 56 may include an image signal processing (ISP) block such as image signal processor 56 configured to perform classic ISP functions that only rely on the input of the live camera feed itself. For example, ISP block 56 may be configured to perform automatic exposure for controlling an exposure setting for the passthrough video feed, automatic color correction (sometimes referred to as automatic white balance) for controlling a white balance, tone curve mapping, gamma correction, shading correction, noise reduction, black level adjustment, demosaicing, image sharpening, high dynamic range (HDR) correction, color space conversion, and/or other image signal processing functions (just to name a few).

Dedicated compute blocks 52 might also include an image compositor such as compositor 58. Compositor 58 can be used to overlay a relatively simple image on top of the passthrough video feed. In response to detecting a system failure or other instability associated with the passthrough video feed, compositor 58 may be directed to overlay a text image alerting the user of a possible error or fault. For example, compositor 58 can overlay a text that reads "please remove the headset" upon detecting one or more system errors or possible instability in the live passthrough video stream. If desired, compositor 58 can be used to overlay other types of warning messages or alerts for the user. Display 14 may receive a processed passthrough video feed from dedicated compute blocks 52.

In additional to the dedicated compute blocks 52, device 10 can further include auxiliary compute blocks 70. In contrast to the dedicated compute blocks 52, auxiliary compute blocks 70 may include hardware and/or software blocks (subsystems) configured to selectively perform higher-level image adjustments that might depend not only on the camera feed itself but also on information gathered from other sensors in device 10. In the example of FIG. 3, the auxiliary compute blocks 70 can include an extended reality (XR) processing block such as XR processor 72 configured to overlay virtual content on top of the real-world content in the passthrough video feed, a gaze tracking block such as gaze tracker 74 configured to track the user's gaze when viewing display 14, a dynamic foveation block such as dynamic foveation subsystem 76 configured to locally enhance the image resolution of the video feed in the area of the user's gaze (while decreasing the image resolution of the video feed in areas not aligned with the user's gaze), a head pose tracking block such as head tracker 78 configured to track the user's head pose (e.g., to track the yaw, pitch, roll, or other movement associated with the user's head), a point of view (POV) correction block such as POV correction subsystem 80 configured to adjust the passthrough video feed to fix any issues associated with the perspective (or tilt) of camera 50 relative to the objects captured by camera 50, a distortion compensation block such as distortion compensation subsystem 82 configured to adjust the passthrough video feed to fix any issues associated with the distortion caused of the lens(es) in camera 50 and/or the lens(es) in display 14, a 3-dimensional (3D) matting block such as 3D matting subsystem 84 configured to compute depth information in the captured images, a scene understanding block such as scene understanding subsystem 86 configured to detect various types of objects in the captured images (e.g., to detect whether a static object is a wall, to detect whether a moving object is a dog, etc.), an image compositor such as compositor 88 configured to overlay VR content generated from block 72 or content from other applications on the passthrough video feed, and/or other compute blocks 90 associated with other software or higher-level applications. In general, XR processor 72 can be configured to generate virtual reality (VR) content, augmented reality (AR) content, mixed reality (MR) content, or may be used to carry out other graphics processing functions. Auxiliary compute blocks 70 of such types are sometimes referred to as application-level or application subsystems. Auxiliary compute blocks 70 may apply various adjustments and corrections to the passthrough video feed before the processed video feed is output by display 14. The dedicated compute blocks 52 and the auxiliary compute blocks 70 may collectively be referred to as processing circuitry.

In accordance with an embodiment, device 10 can automatically switch (or fall back) to a reliable passthrough video feed when a system error that might otherwise cause the passthrough video feed to fail occurs or when detecting an instability in a parameter associated with the passthrough video feed, thus protecting the user's visual comfort and awareness of his or her surroundings. For instance, device 10 can detect when one or more of the auxiliary compute blocks 70 has crashed or is outputting faulty data. As an example, an operating-system-level kernel panic signal (panic flag) or other general fault signal might be output on path 92 when any one or more of the auxiliary compute blocks has failed. The kernel panic signal might be asserted when detecting a memory error and/or when detecting a bug in the operating system (as examples).

As another example, the system can actively monitor individual parameters output by the auxiliary compute blocks 70 on paths 94. In such embodiments, device 10 may include a parameter monitoring block 60 for monitoring the parameters on paths 94. The parameters on path 94 can include VR/AR/MR content generated from XR processing block 72 (e.g., block 60 or 62 can be used to monitor the virtual content output from the auxiliary compute blocks 70). In such active monitoring scheme, the system can detect a specific failure by detecting whether one or more parameters is stale (e.g., by observing repeated frames or repeated virtual content that should otherwise be updated on a regular basis), by detecting whether one or more parameters is missing (e.g., by observing a complete lack of frames or virtual content that should otherwise be present), and/or by detecting whether one or more parameters is invalid (e.g., by observing an invalid or varying framerate or observing that a parameter is outside an expect range of values). If desired, device 10 may also include a timer such as a watchdog timer 62 that monitors when one or more hardware/software subsystems 70 has timed out or stopped operating. For example, watchdog timer 62 can be configured to monitor recent activity of one or more parameters on path 94. Expiration of watchdog timer 62 might indicate that one or more of the parameters being monitored is stale, missing, or invalid, thus indicating that one or more of auxiliary compute blocks 70 has crashed or failed. If desired, an error correcting code (ECC) scheme can optionally be used to detect and/or correct errors in the parameters.

As another example, the system can self-report an error (e.g., individual auxiliary compute blocks can output respective error signals on paths 96). For instance, XR processing block 72 might output error signal Err1 when it crashes or is otherwise experiencing unstable conditions, gaze tracker 74 might output error signal Err2 when it crashes or is otherwise experiencing unstable conditions, etc. In general, any of the hardware components and software applications can throw an exception or other alert informing the system of a possible failure. If desired, the passthrough video feed can output a default (fallback) virtual content that is not dependent on continued operation of the application-level subsystems 70 and that informs the user of a possible failure. As an example, device 10 might overlay an alert message that reads "please take off the headset" when detecting a critical system failure or a video feed instability. As another example, device 10 might play an audio cue or other audible alert for notifying the user when detecting a system failure/error or video feed instability. If desired, the default virtual content can be pre-rendered or rendered using a reliable (backup) rendering component that is part of blocks 52. Operated in this way, the rendering of the default content is not dependent or reliant on proper operation of auxiliary compute blocks 70.

FIG. 3 is a diagram illustrating a multi-tiered approach for outputting the passthrough video feed. When all of the auxiliary compute blocks 70 are functioning properly, the passthrough video feed will incorporate all adjustments from the various application-level subsystems. For instance, the VR/AR content overlays provided by block 72, the dynamic foveation provided by block 76, the POV correction provided by block 80, the lens distortion compensation provided by block 82, and all other application-level functions are active. This is sometimes referred to herein as a "tier-1" or normal passthrough operation 100.

When one or more of the auxiliary compute blocks 70 has crashed, the crashing blocks can be temporarily bypassed (ignored or discarded) or default parameters (sometimes referred to as fallback parameters) can be used for those particular blocks. For instance, if XR processing block 72 has crashed, then the XR processor and other application-level auxiliary compute blocks relying on the rendering function of block 72 can be temporarily suspended and bypassed (e.g., to temporarily suspend any output of XR/computer-generated content) while other non-failing auxiliary compute blocks can continue to function as intended. As another example, if POV correction block 80 has crashed, then the POV correction block and other application-level auxiliary compute blocks relying on data from the POV correction block can be temporarily suspended and bypassed while other non-failing auxiliary compute blocks can continue to function as intended. As yet another example, if distortion compensation block 82 has crashed, then the distortion compensation block and other application-level auxiliary compute blocks relying on data from the distortion compensation block can be temporarily suspended and bypassed while other non-failing auxiliary compute blocks can continue to function as intended. Faulty blocks can be detected by monitoring parameters from each individual compute block, via self-error reporting, or by monitoring other application-level alert flags output from auxiliary compute blocks 70. This operation in which an at least partially enhanced passthrough video feed can still be output even in the presence of one or more possible errors is sometimes referred to herein as a "tier-2" or high-quality passthrough operation 102 or an intermediate passthrough fallback operation.

When one or more of the auxiliary compute blocks 70 has crashed, all of the auxiliary compute blocks can be temporality bypassed/ignored or default (fallback) parameters can be used for all of the auxiliary compute blocks. In this mode, only the functions associated with the dedicated computed blocks 52 are active. For instance, only the basic image signal processing functions provided by block 56 and/or the basic message overlay provided by block 58 is active. This can occur even if only one of the auxiliary compute blocks 70 is faulty. This mode can be triggered when detecting a kernel panic signal or other general operating-system-level panic flag, when detecting expiration of one or more watchdog timers, when detecting that one or more auxiliary compute blocks has crashed (e.g., by monitoring parameters from each individual auxiliary compute block, via self-error reporting, or by monitoring other application-level alert flags output from the auxiliary compute blocks), etc. This operation in which a basic reliable (stable) passthrough video feed passed through to display 14 (without any enhancement or adjustment from the application-level subsystems 70) is sometimes referred to herein as a "tier-3" or simple passthrough operation 104 or a simple passthrough fallback operation. If desired, a safety notice can optionally be overlaid on top of the simple (stable) passthrough video feed. When device 10 falls back to the simple passthrough operation due to detecting a failure in one or more of auxiliary compute blocks or due to other instability in the video feed, device 10 may output audio or haptic alerts (along with an optional text message) notifying the user of the switch to the simple passthrough mode 104.

If desired, the crash or failure of certain auxiliary compute blocks 70 might automatically switch the operation of device 10 from tier-1 or tier-2 directly to the tier-3 simple passthrough fallback mode. As an example, in response to detecting that gaze tracker block 74 has crashed, then device

10 can automatically switch to the tier-3 simple passthrough fallback mode to bypass all of the auxiliary compute blocks 70. As another example, in response to detecting that head pose tracker block 78 has crashed, then device 10 can also automatically switch to the tier-3 simple passthrough fallback mode to bypass all of the auxiliary compute blocks 70. This is merely illustrative. The failure of other blocks 70 might also trigger such direct switching to the tier-3 fallback mode.

In some embodiments, device 10 may alternate between normal operating mode 100 and the simple passthrough mode 104 (e.g., the tier-2 operation is not used). In other words, the high-quality passthrough mode 102 is optional. In other embodiments, device 10 might alternate between normal operating mode 100 and the high-quality passthrough mode 102 (e.g., the tier-3 operation is not used). In other words, the simple passthrough mode 104 is optional. In yet other embodiments, device 10 might switch among normal operating mode 100, high-quality passthrough mode 102, and simple passthrough mode 104 (e.g., all three tiers or video passthrough modes are in use).

Figure 5:
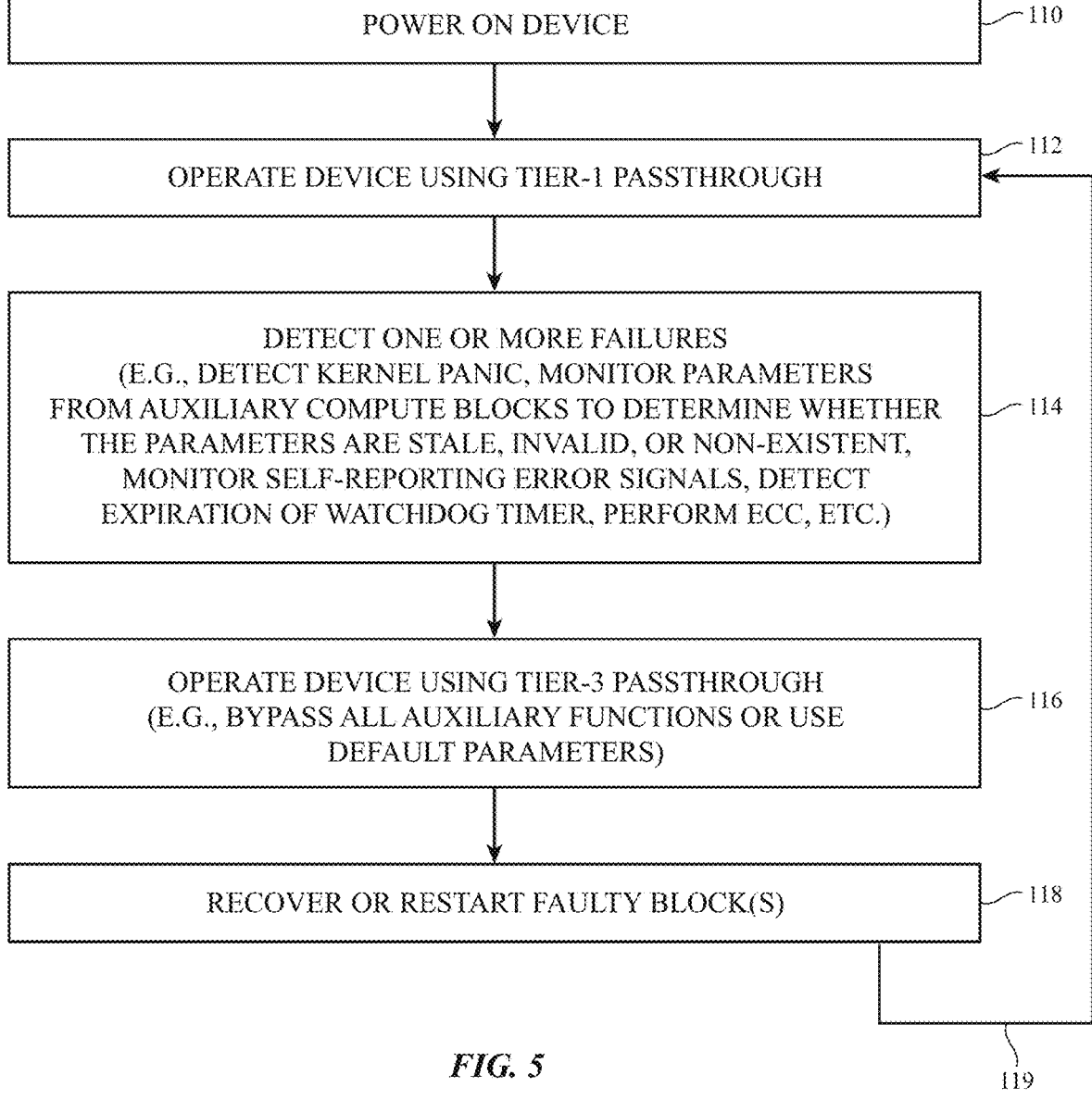
FIG. 5 is a flow chart of illustrative operations for switching between two different tiers in accordance with some embodiments.

FIG. 5 is a flow chart of illustrative operations for using device 10 to switch between the tier-1 normal passthrough mode and the tier-3 simple passthrough fallback mode (sometimes referred to as first and second video passthrough modes, respectively). During the operations of block 110, device 10 can be powered on. After being powered on, device 10 can be operated in the tier-1 normal passthrough mode (see operations of block 112).

During the operations of block 114, device 10 can detect one or more general (system-level) or specific (block-level) failures. For example, device 10 may detect a failure by observing assertion of a kernel panic flag, by monitoring parameters from the auxiliary compute blocks to determine whether a parameter is stale, invalid, or non-existent, by monitoring self-reporting error signals output from the auxiliary compute blocks, by detecting expiration of one or more watchdog timers, by performing ECC operations, or by performing other error/fault detection operations.

In response to detecting a failure during the operations of block 114, device 10 may switch to operating in the tier-3 simple passthrough fallback mode (see operations of block 116). During the simple passthrough fallback mode, all of the auxiliary block functions can be bypassed or default (fallback) parameters may be used for all of the auxiliary compute blocks. For example, during the tier-3 mode, only the basic ISP functions associated with block 56 are applied to the passthrough video feed while the application-level image adjustment algorithms associated with blocks 70 are temporarily suspended or inactive.

During the operations of block 118, the hardware/software subsystems associated with the failing or crashing blocks can be restarted, reset, or otherwise recovered in an attempt to regain proper functionality. Once the problematic blocks are operating properly, device 10 can revert back to operating in the tier-1 normal passthrough mode, as shown by loopback path 119. If desired, device 10 can optionally be restarted (rebooted) if the problematic blocks are not able to recover after a certain period of time. For example, device 10 can optionally be rebooted if one or more of the problematic blocks are not able to recover within 5 seconds, within 10 seconds, within 1-5 seconds, within 5-10 seconds, within 10-20 seconds, or the tier-3 duration exceeds some other threshold. This threshold for triggering a reboot or other recovery mode can be computed or adjusted based on past records of transitions since the past reboot (e.g., multiple recoveries of the same failing block within a parameterized time period may result in a device reboot) or over the life of device 10 as recorded in some non-volatile memory (e.g., the threshold after which multiple failures of a given block results in a device reboot instead of an attempt to reset just that block may be dynamically computed based on past data indicating that device reboots are always triggered after a smaller number of attempted recoveries has occurred). In some embodiments, after device 10 has been operating in the tier-3 simple passthrough mode 104 for a certain period of time, device 10 can optionally transition to yet another mode in which display 14 presents a black screen and/or a cached (default) image while device 10 restarts. If desired, any type of virtual content with a visual message and/or an audio message can be output to the user during this time to let the user know that device 10 rebooting.

The example of FIG. 5 that defaults to the tier-1 normal passthrough operation upon startup (block 112) is merely illustrative. If desired, device 10 can alternatively default to the tier-3 simple passthrough mode (block 116) following startup. Device 10 can eventually switch to operating in the tier-1 normal passthrough mode after verifying that all auxiliary compute block functions are functioning properly.

Figure 6:
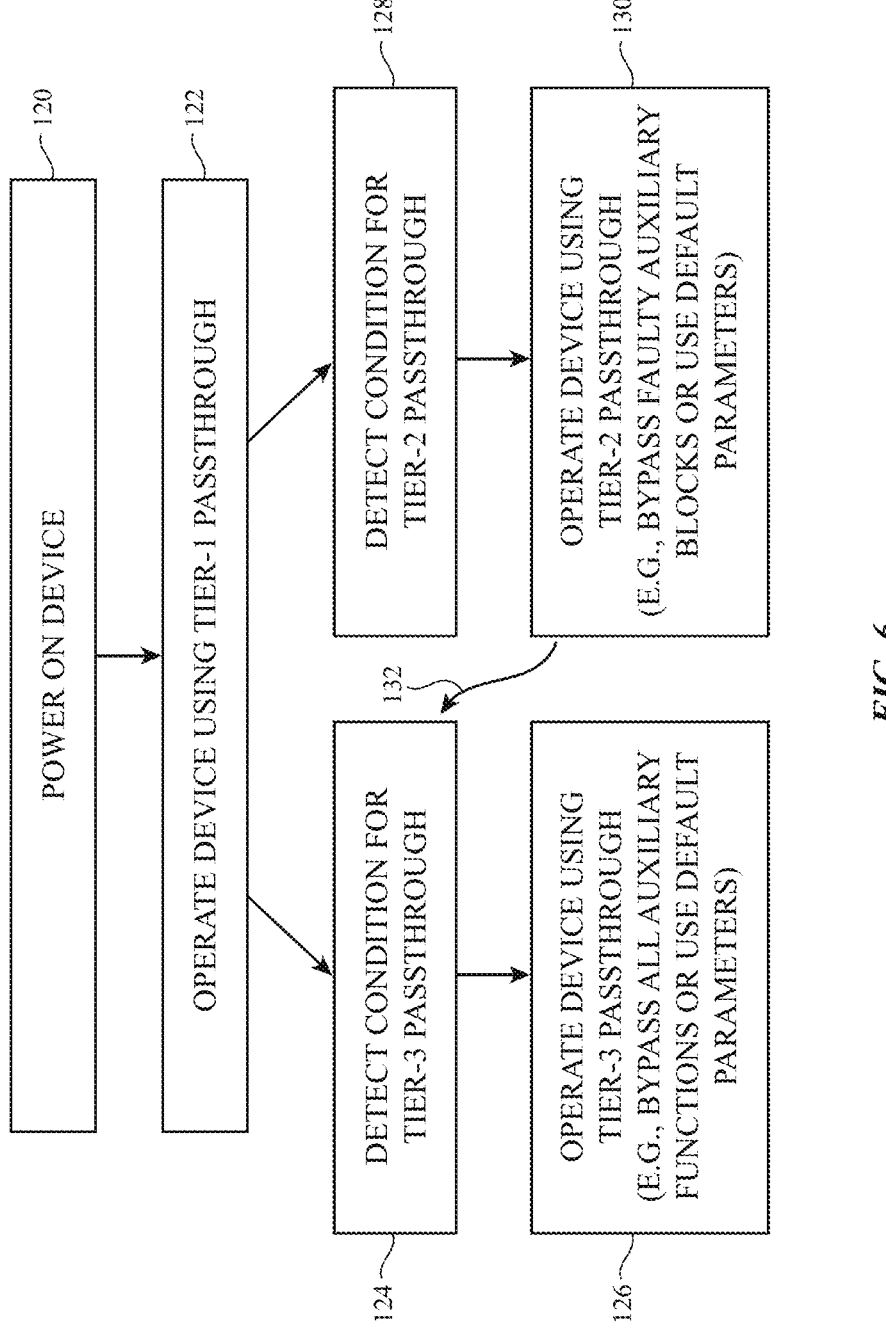
FIG. 6 is a flow chart of illustrative operations for switching a passthrough video stream among three different tiers in accordance with some embodiments.

The example of FIG. 5 in which head-mounted device 10 switches between tier-1 and tier-3 passthrough mode is illustrative. FIG. 6 is a flow chart of illustrative operations for using device 10 to switch among the tier-1 normal passthrough mode, the tier-3 simple passthrough fallback mode, and the tier-2 high-quality passthrough fallback mode. During the operations of block 120, device 10 can be powered on. After being powered on, device 10 can be operated in the tier-1 normal passthrough mode (see operations of block 122).

During the operations of block 124, device 10 can detect a condition for triggering the tier-3 simple passthrough fallback mode. For example, device 10 may detect a general failure by observing assertion of a kernel panic flag, by detecting expiration of one or more watchdog timers, or by performing other error detection operations indicative of a system-level fault.

In response to detecting a condition for triggering the tier-3 operation, device 10 may switch to operating in the tier-3 simple passthrough fallback mode (see operations of block 126). During the simple passthrough fallback mode, all of the auxiliary block functions can be bypassed or default (fallback) parameters may be used for all of the auxiliary compute blocks. For example, during the tier-3 mode, only the basic ISP functions associated with block 56 are applied to the passthrough video feed while the application-level image adjustment algorithms associated with blocks 70 are temporarily suspended or inactive. During this time, the hardware/software subsystems associated with the failing or crashing blocks can be restarted or reset in an attempt to regain proper functionality. Once the problematic blocks are operating properly, device 10 can revert back to operating in the tier-1 normal passthrough mode (e.g., looping back to the operations of block 122). If desired, it is also possible for device 10 switch from operating in the tier-3 simple passthrough mode to operating in the tier-2 high-quality passthrough mode if the condition for triggering the tier-2 operation is satisfied. For example, automatic switching from the tier-3 mode to the tier-2 mode might be triggered when a more critical auxiliary compute block such as the gaze tracker recovers and regains proper functionality but a less critical auxiliary compute block such as the VR content processor is still failing or attempting recovery. As another example, automatic switching from the tier-3 mode to the tier-1 or tier-2 mode might be triggered when the XR processing block 72 that has previously crashed has regained proper functionality. In such scenarios, block 72 can begin rendering XR content and the computer-generated XR content can gradually be faded in or merged with the real-world passthrough content to present the user with a high(er) quality passthrough feed.

During the operations of block 128, device 10 can detect a condition for triggering the tier-2 high-quality passthrough fallback mode. In some embodiments, device 10 may detect a specific failure by monitoring parameters from the auxiliary compute blocks to determine whether a parameter is stale, invalid, or non-existent, by monitoring self-reporting error signals output from the auxiliary compute blocks, by performing ECC operations, or by performing other error/fault detection operations. For example, a condition for triggering the tier-2 high-quality passthrough fallback mode may be upon detection of a first threshold number of repeating frames and/or upon detection of repeating frames over a first threshold period of time. For example, upon detecting ten or more repeated frames over at least 100 ms, device 10 may switch to the tier-2 high quality passthrough fall back mode. The first threshold number of repeating frames and/or the first threshold time period for triggering the tier-2 high quality passthrough fall back mode may be adjustable. The first threshold number of repeating frames and/or the first threshold time period may be chosen to present the user with a more comfortable passthrough experience within a few frames (e.g., so that the user is prevented from noticing repeated frames over an extended period of time, which can lead to visual discomfort). This threshold or condition for switching to the tier-2 high-quality passthrough fallback mode may be adapted or computed based on historical data (e.g., data since a last reboot or data accumulated over the lifetime of device 10). Adjusting thresholds in this way can present the user with an initially slow response to adverse/failing conditions that allow device 10 to safely recover, where the response can speed up in response to gathering data indicating that the recovery will be expected to fail at a lower threshold than initially configured.

In response to detecting a condition for triggering the tier-2 operation, device 10 may switch to operating in the tier-2 high quality passthrough fallback mode (see operations of block 130). During the high-quality passthrough fallback mode, only some (a subset) of the auxiliary block functions can be bypassed or default (fallback) parameters may be used for the faulty auxiliary compute block(s). For example, during the tier-2 mode, all functions associated with a crashing XR processing block 72 can be bypassed or ignored while functions associated with the remaining properly functioning auxiliary compute blocks 70 are still in play (e.g., any generation of virtual content may be temporarily suspended). In other words, only the functions associated with the failing auxiliary compute block(s) are temporarily suspended or inactive. During this time, the hardware/software subsystems associated with the failing or crashing blocks can be restarted or reset in an attempt to regain proper functionality. Once the problematic blocks are operating properly, device 10 can revert back to operating in the tier-1 normal passthrough mode (e.g., looping back to the operations of block 122). For example, automatic switching from the tier-2 mode to the tier-1 mode might be triggered when the XR processing block 72 that has previously crashed has regained proper functionality. In such scenarios, block 72 can begin rendering XR content and the computer-generated XR content can gradually be faded in or merged with the real-world passthrough content to present the user with a high quality passthrough feed. If desired, it is also possible for device 10 switch from the tier-2 mode to operating in the tier-3 simple passthrough mode if the condition for triggering the tier-3 operation is satisfied, as shown by path 132. For example, automatic switching from the tier-2 mode to the tier-3 mode might be triggered when a more critical auxiliary compute block such as the gaze tracker fails. As another example, automatic switching from the tier-2 to the tier-3 mode might be triggered when the number of repeating frames exceeds a second threshold number of repeating frames and/or upon detection of repeating frames over a second threshold period of time. The second threshold number of repeating frames that triggers the tier-3 mode may be greater than the first threshold number of repeating frames that triggers the tier-2 mode. The second threshold period of time for triggering the tier-3 mode may be greater than the first threshold period of time for triggering the tier-2 mode. The second threshold number of repeating frames and/or the second threshold time period for triggering the tier-3 simple passthrough fall back mode may be adjustable. This threshold or condition for switching to the tier-3 passthrough fallback mode may be adapted or computed based on historical data (e.g., data since a last reboot or data accumulated over the lifetime of device 10). Adjusting thresholds in this way can present the user with an initially slow response to adverse/failing conditions that allow device 10 to safely recover, where the response can speed up in response to gathering data indicating that the recovery will be expected to fail at a lower threshold than initially configured.

Figure 7:
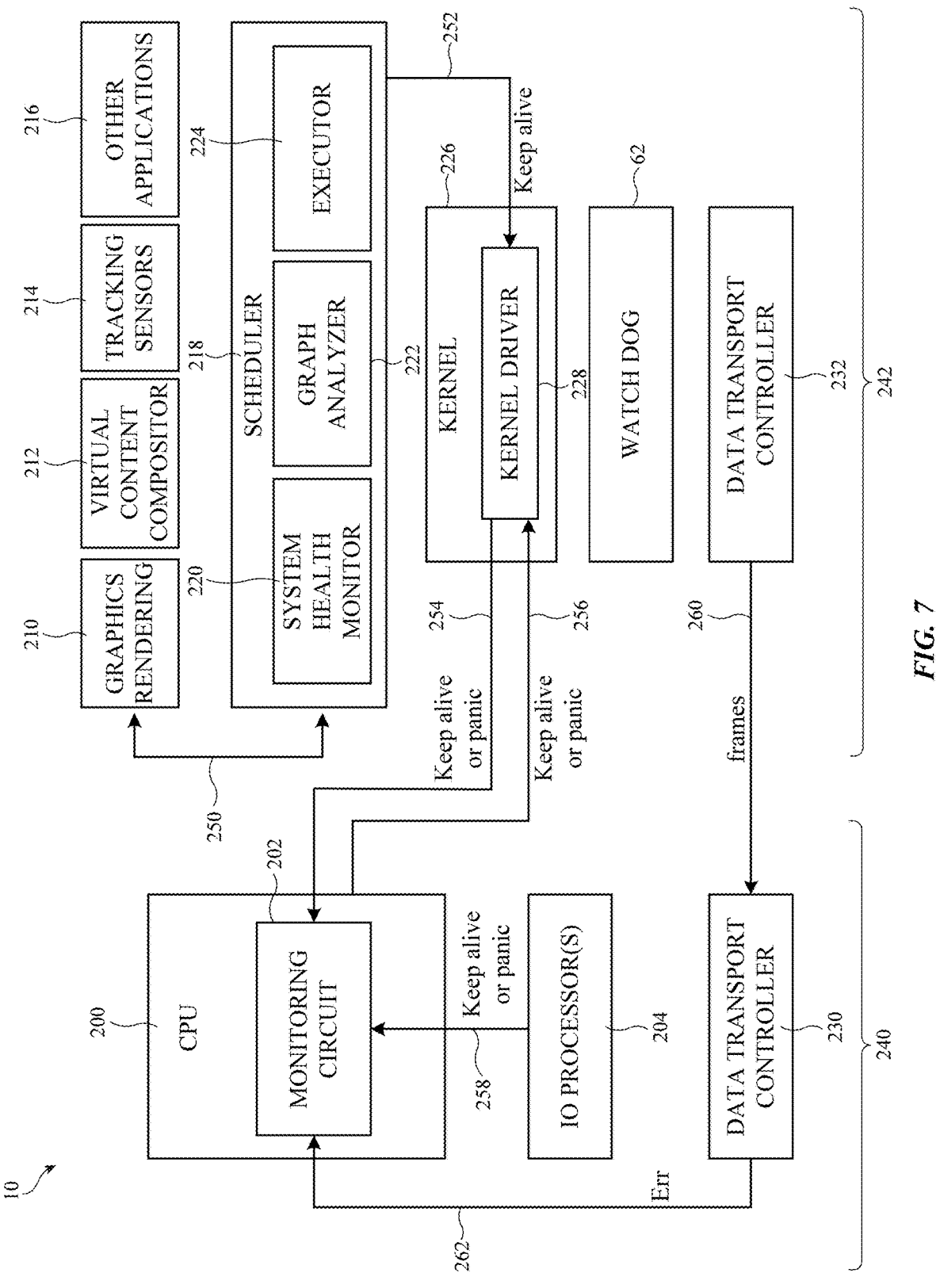
FIG. 7 is a diagram showing illustrative hardware and software subsystems configured to support a hierarchical failure detection scheme in a head-mounted device in accordance with some embodiments.

The division of compute blocks within device 10 into dedicated compute blocks 52 and auxiliary compute blocks 70 as described in connection with FIG. 3 is exemplary and is not intended to limit the scope of the present embodiments. FIG. 7 illustrates another system architecture for electronic device 10. As shown in FIG. 7, device 10 may include various software and hardware subsystems, including a graphics rendering subsystem 210, a virtual content compositor 212, tracking sensors 214, and other applications 216, just to name a few.

Graphics rendering subsystem 210, sometimes referred to as a graphics rendering engine, graphics rendering pipeline, or graphics rendering application, can be configured to render or generate virtual content (e.g., virtual reality content, augmented reality content, mixed reality content, or extended reality content) or may be used to carry out other graphics processing functions. The virtual content output from the graphics rendering subsystem 210 can optionally be foveated (e.g., subsystem 210 can render foveated virtual content). Graphics rendering subsystem 210 can synthesize photorealistic or non-photorealistic images from one or more 2-dimensional or 3-dimensional model(s) defined in a scene file that contains information on how to simulate a variety of features such as information on shading (e.g., how color and brightness of a surface varies with lighting), shadows (e.g., how to cast shadows across an object), texture mapping (e.g., how to apply detail to surfaces), reflection, transparency or opacity (e.g., how light is transmitted through a solid object), translucency (e.g., how light is scattered through a solid object), refraction and diffraction, depth of field (e.g., how certain objects can appear out of focus when outside the depth of view), motion blur (e.g., how certain objects can appear blurry due to fast motion), and/or other visible features relating to the lighting or physical characteristics of objects in a scene. Graphics renderer 210 can apply rendering algorithms such as rasterization, ray casting, ray tracing, radiosity, or other graphics processing algorithms.

Tracking sensors 214 can include a gaze tracking subsystem, sometime referred to as a gaze tracker or gaze tracking application, configured to gather gaze information or point of gaze information. The gaze tracker may employ one or more inward facing camera(s) and/or other gaze-tracking components (e.g., eye-facing components and/or other light sources that emit beams of light so that reflections of the beams from a user's eyes may be detected) to monitor the user's eyes. One or more gaze-tracking sensor(s) may face a user's eyes and may track a user's gaze. A camera in gaze-tracking subsystem may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or other gaze information. Cameras in the gaze tracker may sometimes be referred to as inward-facing cameras, gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's gaze.

Tracking sensors 214 can also include a face and body tracking subsystem configured to perform face tracking (e.g., to capture images of the user's jaw, mouth, etc. while the device is worn on the head of the user) and body tracking (e.g., by capturing images of the user's torso, arms, hands, legs, etc. while the device is worn on the head of user). If desired, the face and body tracking subsystem can also track a user's head pose by directly determining any movement, yaw, pitch, roll, etc. for head-mounted device 10. The yaw, roll, and pitch of the user's head may collectively define a user's head pose.

Tracking sensor 214 can further include a hands tracking subsystem, sometimes referred to as a hands tracker, configured to monitor a user's hand motion/gesture to obtain hand gestures data. For example, the hands tracker may include a camera and/or other gestures tracking components (e.g., outward facing components and/or light sources that emit beams of light so that reflections of the beams from a user's hand may be detected) to monitor the user's hand(s). One or more hands-tracking sensor(s) 214 may be directed towards a user's hands and may track the motion associated with the user's hand(s), may determine whether the user is performing a swiping motion with his/her hand(s), may determine whether the user is performing a non-contact button press or object selection operation with his/her hand(s), may determine whether the user is performing a grabbing or gripping motion with his/her hand(s), may determine whether the user is pointing at a given object that is presented on display 14 using his/her hand(s) or fingers, may determine whether the user is performing a waving or bumping motion with his/her hand(s), or may generally measure/monitor three-dimensional non-contact gestures ("air gestures") associated with the user's hand(s). Tracking sensors 214 operable to obtain gaze, pose, hands gesture, and other information relating to a motion of a user of device 10 are sometimes referred to as user tracking sensors.

The virtual content generated by graphics rendering pipeline 210 and the user tracking information (e.g., point of gaze information, head pose information, hands gesture information, and information associated with other user body parts) output from user tracking sensors 214 can be conveyed to virtual content compositor 212. Virtual content compositor 212 is sometimes referred to as a virtual content compositor application. Based on content and information from multiple data sources, virtual content compositor 212 can generate corresponding composited virtual frames. The virtual content compositor 212 can perform a variety of compositor functions that adjusts the virtual content based on the user tracking information to help improve the image quality of the final content that will be displayed to the user. For example, virtual content compositor 212 can perform image warping operations to reproject the virtual content from one user perspective to another, dynamic foveation operations that adjust the detail or quality of a video feed based on the user's gaze (e.g., by increasing image detail or resolution of a video feed in the area of the user's gaze and/or reducing image detail or resolution of the video feed in areas not aligned with the user's gaze), lens distortion compensation operations to fix issues associated with the distortion that might be caused by lens(es) 30 in front of display 14, brightness adjustments, color shifting, chromatic aberration correction, optical crosstalk mitigation operations, and/or other optical correction processes to enhance the apparent quality of the composited virtual frames.

Device 10 may include additional hardware and/or software components to support one or more other applications 216. As examples, applications 216 can include an automatic speech recognition (ASR) dictation application that can be executed (run) to transcribe speech to text, an ASR assistant application such as a voice-controlled automated assistant that can be executed to monitor voice commands from a user and to perform various functions in response to the user's voice commands, a text-to-speech (TTS) application that can be executed to convert text into audio, a media player application that can be run to play or stream movie (cinematic) content or other immersive media content on device 10, an e-mail application, a text messaging application, a web browsing application, a maps application, an image editing application, a weathers application, a mobile payments application, a gaming application, a social networking application, and/or a multiuser communication session application that can be run to establish a multiuser communication session (just to name a few). Herein, a multiuser communication session refers to a communication session in which two or more devices are participating in an extended reality (XR) environment. The multiuser communication session application may control the XR content presented using device 10 during a multiuser communication session. During a multiuser communication session, multiple electronic devices can be connected via a network. Some of the electronic devices (and corresponding users) may be located in different physical environments, whereas some of the electronic devices (and corresponding users) in the multiuser communication session may be located in the same physical environment. The applications described above are exemplary. If desired, device 10 can be operated to run additional or other applications.

In general, the applications associated with hardware and software subsystems 210, 212, 214, and 216 can issue time-sensitive tasks and non-time-sensitive tasks. Time-sensitive tasks may include tasks that directly affect the user interface, that provide real-time content, etc. For example, time-sensitive tasks can include tasks associated with head tracking since a user looking left or right may directly affect what content is currently displayed, and a delay in tracking the user's head movement may result in jitter in the displayed content. Some time-sensitive tasks have a high amount of determinism as these tasks may need to be repeated periodically and have consistent, known dependencies. For instance, head tracking operations may involve reoccurring visual odometry tasks that consume multiple video frames and sensor data over time to determine a change in position and orientation of device 10 in a physical environment. In contrast, an application requesting a thread to download a user's email in the background may be a non-time-sensitive task.

In accordance with some embodiments, device 10 may be provided with an intelligent scheduler 218 configured to determine a more insightful schedule for the performance of time-sensitive tasks. Scheduler 218 may receive time-sensitive tasks from one or more of subsystems 210, 212, 214, and 216 via one or more path(s) 250 and output an optimized schedule for the requested tasks. As shown in FIG. 7, scheduler 218 may include a system health monitor 220, a graph analyzer 222, and an executor 224. System health monitor 220 may be configured to monitor ongoing variations in the power, performance, and thermal statistics of device 10 to proactively determine the system's current health level, which can then be used by scheduler 218 to determine what resources are currently available for performing the time-sensitive tasks and to schedule the time-sensitive tasks accordingly. Scheduler 218 may proactively revise its schedule as the system health changes over time. For example, if scheduler 218 determines from the health information that it will no longer be able to satisfy particular timing constraints in the near future, scheduler 218 may contact the applications requesting the associated time-sensitive tasks and allow them to decide how to handle the device's declining health before device 10 reaches some problematic threshold.

Figure 9:
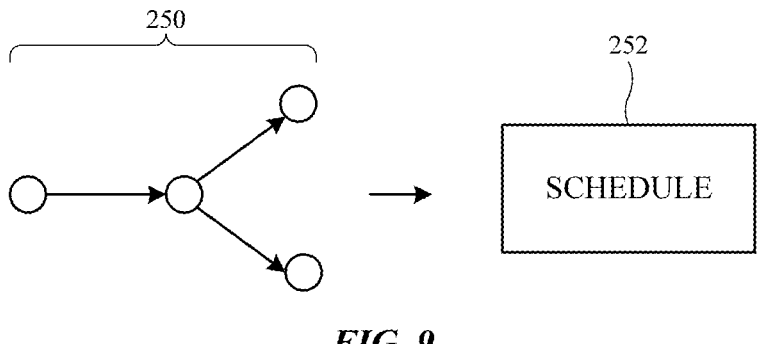
FIG. 9 is a diagram of an illustrative relationship compute graph in accordance with some embodiments.

Graph analyzer 222 may take a holistic view of the time-sensitive tasks being requested by analyzing the current health level output from system health monitor 220, a compute graph, and other metadata in order to generate a suitable schedule for the time-sensitive tasks. FIG. 9 shows an illustrative relationship compute graph 250 identifying the interrelationship of tasks to be performed by the one or more application-level subsystems. Such a compute graph 250 may include, for a given requested time-sensitive task, a graph node that specifies the time-sensitive tasks providing the inputs to be used in the performance of the given time-sensitive task and the time-sensitive tasks that should receive the outputs of the given task once it completes (e.g., compute graph 25 may describe one or more tasks associated with an application). The compute graph 250 may also include additional information such as the resources needed for the performance of the time-sensitive tasks, timing constraints associated with the time-sensitive tasks, the interrelationship of different tasks, etc. Based on this information, scheduler 218 may determine a schedule 252 indicating how the time-sensitive tasks should be implemented to improve performance and optimize resource usage. Scheduler 218 is therefore sometimes also referred to as a resource manager. In some embodiments, scheduler 218 can focus on identifying a critical path in the performance of a set of time-sensitive tasks and attempt to schedule tasks along this critical path in a manner that satisfies the timing constraints of the time-sensitive tasks. Executor 224 may consume or execute the schedule determined by graph analyzer 222.

Scheduler 218 may further communicate with a kernel subsystem such as kernel 226. Kernel 226 is a component of an operating system of device 10 and is executable to manage various resources on device 10. While scheduler 218 can be considered to be residing in an application (or user) layer, kernel 226 can be considered to be residing in a kernel layer (space). The application layer can refer to a classification of programs that execute in a mode with restricted privileges. In such a mode, a program may be barred from executing particular instruction set architecture defined instructions. In contrast, the term kernel layer can refer to a classification of programs that execute in a mode in which a processor on device 10 executes a program with unrestricted privileges and is typically reserved for programs responsible for system management such as operating system kernels, bootloaders, drivers, hypervisors, etc. The term kernel space can refer to restricted regions of memory that can only be accessed by programs executing in the kernel layer. In some embodiments, kernel-layer applications may be restricted from accessing application-space regions of memory. To facilitate with the management of resources on device 10, kernel 226 may include one or more kernel driver(s) 228.

Device 10 may include watchdog timer 62. As described above in connection with FIG. 3, watchdog timer 62 can be configured to monitor when one or more hardware/software subsystems on device 10 has timed out or stopped operating. For example, watchdog timer 62 can be used to determine whether one or more threads running on a processor such as CPU 200 has stopped progressing. A watchdog timer 62 that monitors the progress of one or more hardware components is sometimes referred to as a hardware watchdog timer. Watchdog timer 62 can optionally monitor parameters associated with hardware and/or software subsystems. Expiration of watchdog timer 62 might also indicate that one or more the parameters being monitored is stale, missing, or invalid.

Kernel 226 can also communicate with a processor such as central processing unit (CPU) 200. CPU 200 may be configured to control operations associated with one or more display pipeline for device 10. CPU 200 may also be configured to control operations associated with one or more audio components such as microphones for detecting sound or voice from the user or the environment surrounding device 10 and speakers for outputting music, audio alerts, or other audio output to the user. In general, CPU 200 can also be configured to control operations associated with other input-output devices of device 10, including but not limited to display(s) 14 (see, e.g., FIGS. 1 and 2), sensors 16 (see, e.g., FIG. 2), camera(s) 50, gaze tracker 74, head pose tracker 78, tracking sensors 214 (see, e.g., FIG. 7), and/or other input-output components.

CPU 200, sometimes referred to as an input-output devices control CPU, can also communicate with one or more input-output (IO) processors 204. As an example, processors 204 can include multiple image signal processors (ISPs) each configured to perform classic ISP functions for a respective image sensor. Each ISP 204 may, for example, be configured to perform automatic exposure for controlling an exposure setting for a passthrough video feed, automatic color correction (sometimes referred to as automatic white balance) for controlling a white balance, tone curve mapping, gamma correction, shading correction, noise reduction, black level adjustment, demosaicing, image sharpening, high dynamic range (HDR) correction, color space conversion, and/or other image signal processing functions (just to name a few). The example of an ISP block 204 is illustrative. If desired, IO processors 204 may include other types of IO processing components.

In some embodiments, CPU 200 and IO processors 204 can be formed as part of a first integrated circuit (IC) chip (see component grouping 240), whereas graphics rendering subsystem 210, virtual content compositor 212, applications 216, scheduler 218, kernel 226, and watchdog 62 may be formed as part of a second IC chip (see component grouping 242). Although tracking sensors 214 is shown as belonging in component group 242, tracking sensors 214 are considered input-output components are can therefore be formed as part of the first IC chip in component grouping 240. Configured in this way, the second IC chip can include a data transport controller 232 for streaming composed virtual content to a corresponding data transport controller 230 in the first IC chip via path 260. The virtual content being output from data transport controller 232 can be generated using graphics renderer 210 and composed by virtual content compositor 212 based on the user tracking information. Data transport controller 232 may optionally compress the virtual content and send the compressed frames over streaming path 260 to data transport controller 230, which can then optionally decompress the received frames. The first IC chip can also include a media merging compositor for merging the received virtual content with the passthrough video feed output from the IO processors 204 that are part of the display pipeline.

This example in which the various hardware and software subsystems of FIG. 7 are divided into two separate IC chips is merely illustrative. In other suitable arrangements, all of components shown in FIG. 7 can be integrated as part of a single system on chip (SoC). In yet other embodiments, the components show in FIG. 7 can be grouped into three or more separate integrated circuit dies.

The system architecture of device 10 as shown in FIG. 7 can be leveraged to perform a failure detection scheme at various levels and is therefore sometimes referred to herein as a "hierarchical" failure detection scheme. The hierarchical failure detection scheme described herein is generally used for detecting critical or sustained failures such as failures that would result in the user seeing a black screen, dynamic content that is erroneously stuck, consecutive loss of N image frames resulting in tens or hundreds of milliseconds of missing data, or other critical failure that would be intolerable when device 10 is being operated to provide an immersive experience for the user. Occasional frame loss or glitches can optionally be tolerated or ignored. Critical system failures or crashes can be problematic, especially when the user is relying on the passthrough video feed to navigate the external environment. If care is not taken, the visual quality of the video feed can also degrade, resulting in visual discomfort for the user. The term "fail" or "failure" can refer to and be defined herein as a condition where a subsystem is not operating as intended, is stuck at some known or unknown state, is repeatedly outputting the same or old information, is outputting incomplete information (i.e., information is missing), is not progressing along in a timely manner, or is otherwise operating in a way that would result in a suboptimal viewing experience or visual discomfort for the user if some corrective action is not subsequently taken.

FIG. 8 is a flow chart of illustrative steps for operating the system architecture of FIG. 7 to perform a hierarchical failure detection scheme in accordance with some embodiments. During the operations of block 300, scheduler 218 (sometimes referred to as a task scheduling and resource managing subsystem) may be used to monitor the operations of various subsystems such as the operations of graphics rendering subsystem 210, virtual content compositor 212, tracking sensors 214, applications 216, applications related to generating VR/AR/XR content, and/or other hardware or software subsystems via data conveyed over path 250. The subsystems being monitored by scheduler 218 or the subsystems outputting time-sensitive tasks to be scheduled by scheduler 218 are sometimes referred to as "clients."

As described above in connection with FIG. 7, scheduler 218 can be used to monitor a compute graph associated with a given algorithm (see, e.g., compute graph 250 of FIG. 9). As examples, scheduler 218 can monitor/analyze a first compute graph associated with a gaze algorithm run by the gaze tracker, a second compute graph associated with a head pose tracking algorithm run by the head pose tracker, a third compute graph associated with a hands tracking or hands matting algorithm run by the hands tracker, a fourth compute graph associated with one or more cameras or image sensors on device 10, a fifth compute graph associated with a spatial audio rendering algorithm, a sixth compute graph associated with a graphics rendering algorithm run by graphics rendering application 210, a seventh compute graph associated with a virtual content compositor algorithm run by virtual content compositor application 212, and/or other algorithms associated with generating XR content. Scheduler 218 can identify the inputs that are needed for each compute graph, can identify what pipeline stages are needed for each compute graph, and can analyze the known information to monitor the operation of each algorithm at a relatively high frequency. Operated in this way, the task scheduling and resource management subsystem 218 can be used to simultaneously monitor the real-time operation and health level of many different clients running on device 10 without much overhead.

In an example where scheduler 218 monitors the first compute graph (sometimes referred to as a gaze tracking graph) associated with the gaze algorithm run by the gaze tracker, scheduler 218 can be configured to detect a failure of the gaze tracker by observing no new output(s) or other anomalies from the gaze tracking graph for a number of iterations. In another example where scheduler 218 monitors the second compute graph (sometimes referred to as a head pose tracking graph) associated with the head pose tracking algorithm run by the head pose tracker, scheduler 218 can be configured to detect a failure of the head pose tracker by observing no new output(s) or other anomalies from the head pose tracking graph for a number of iterations. In another example where scheduler 218 monitors the fourth compute graph (sometimes referred to as a camera or video stream graph) associated with one or more cameras or image sensors on device 10, scheduler 218 can be configured to detect a failure of one or more of the generated camera streams by observing no new output(s) or other anomalies from the camera graph for a number of iterations. In another example where scheduler 218 monitors the seventh compute graph (sometimes referred to as a system compositor graph) associated with the virtual content compositor algorithm run by virtual content compositor application 212, scheduler 218 can be configured to detect a situation where the virtual content compositor is not generating any new display frames by observing no new output(s) or other anomalies from the system compositor graph for a number of iterations.

Figure 4:
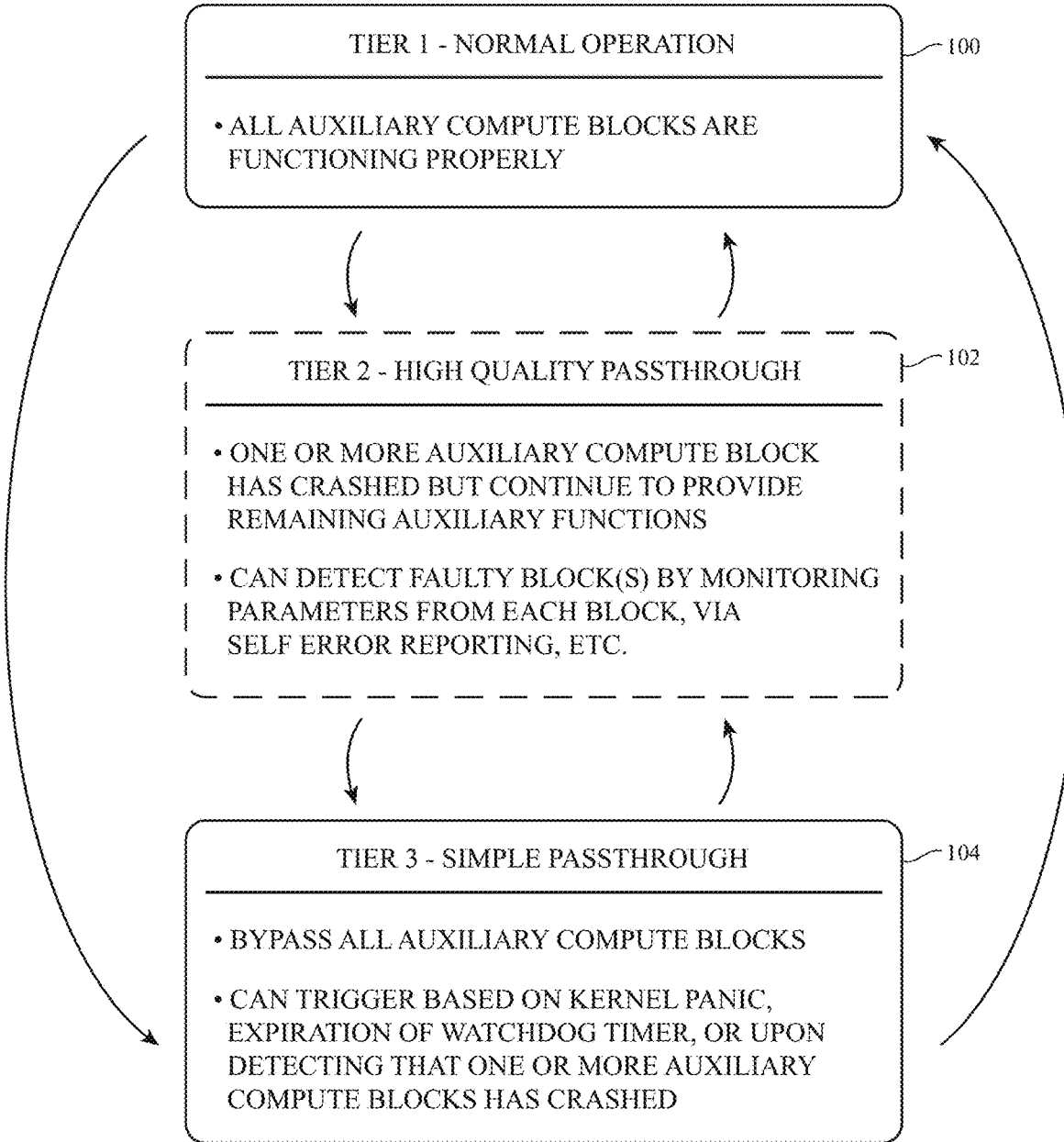
FIG. 4 is a diagram illustrating how a passthrough video stream can be categorized into different tiers depending on current operating conditions in accordance with some embodiments.

During the operations of block 302, the system can take suitable action and/or fall back to tier-2 or tier-3 passthrough (see, e.g., FIG. 4) in response to scheduler 218 detecting a failure. For example, if scheduler 218 detects that the gaze algorithm has not generated new data or has otherwise fails for m consecutive cycles (where m can be any integer value greater than 2, greater than 5, in the range of 5-10, greater than 10, greater than 20, greater than 30, etc.), scheduler 218 might direct the gaze tracker subsystem to restart the gaze algorithm or to reboot the gaze tracking sensor. If restarting the gaze algorithm or rebooting the gaze tracking sensor does not resolve the issue, device 10 may fall back to the tier-2 high quality passthrough mode where only gaze-related algorithms such as dynamic foveation can be disabled or bypassed (e.g., static foveation can be temporarily activated) or to the tier-3 simple passthrough mode where all auxiliary algorithms related to XR content generation are bypassed until the system recovers from this failure. This example related to monitoring the gaze algorithm is illustrative. As another example, scheduler 218 can detect a failure of the graphic rendering algorithm run by application 210. As another example, if scheduler 218 detects a failure of the head pose tracking algorithm run by tracker 78, scheduler 218 can terminate showing any virtual content and/or trigger tier-2 or tier-3 passthrough mode until the system recovers from the failure. As another example, scheduler 218 can detect a failure of the virtual content compositor algorithm run by application 212 and trigger tier-2 or tier-3 passthrough mode to avoid user discomfort until the system recovers from the failure. As another example, if scheduler 218 detects that one or more of the video streams generated from the cameras are failing, scheduler 218 can optionally trigger tier-2 or tier-3 passthrough mode depending on the criticality of the failing stream(s). In general, scheduler 218 can be used to detect a failure of any application configured to generate extended reality (XR) content (e.g., scheduler 218 can optionally monitor any workload that is critical to the generation of XR content or the overall XR experience provided by device 10). Different algorithms or applications being monitored by scheduler 218 can employ different configurable corrective actions or can trigger different configurable policies for restricting or otherwise limiting one or more subsystems related to the failing algorithm to mitigate the failure.

While scheduler 218 can be used to monitor the health levels of various algorithms running on device 10, it is possible for scheduler 218 running in the application layer to crash or hang. Thus, during the operations of block 304, a kernel driver 288 within kernel 226 can be used as an additional (backup) level of detection to monitor the behavior of scheduler 218. For example, scheduler 218 can be configured to send keep alive messages (sometimes also referred to as heartbeat or status signals) to kernel driver 228 via path 252. A properly functioning scheduler 218 will send keep alive messages periodically to kernel driver 228, whereas a malfunctioning scheduler 218 (e.g., a scheduler that has crashed, hung, or is otherwise failing) will stop sending keep alive messages to kernel driver 228.

During the operations of block 306, the system can fall back to tier-2 or tier-3 passthrough in response to kernel driver 228 detecting a scheduler failure. For example, when kernel driver 228 has not received a keep alive message after an extended period of time exceeding a threshold time interval within which keep alive messages are expected to arrive, device 10 may fall back to the tier-2 high quality passthrough mode where only some auxiliary subsystems related to XR content generation are bypassed or to the tier-3 simple passthrough mode where all auxiliary algorithms related to XR content generation are bypassed. This example in which kernel driver 228 in the kernel space is being used to monitor the health of scheduler 218 is illustrative. In other embodiments, any other trusted supervisor component in the application layer or the kernel layer can be employed to detect when scheduler 218 is failing.

While kernel 226 can be used to monitor the health level of scheduler 218, it is possible for kernel driver 228 running in the kernel layer to crash or hang due to a software bug or memory failure. Thus, during the operations of block 308, a monitoring circuit or component 202 within CPU 200 can be used as an additional (backup) level of detection to monitor the behavior of kernel driver 228. For example, kernel driver 228 or other kernel level supervisor can be configured to send keep alive messages (sometimes also referred to as heartbeat or status signals) to monitoring circuit 202 via path 254. A properly functioning kernel driver 228 will send keep alive messages periodically to monitoring circuit 202, whereas a malfunctioning kernel driver 228 (e.g., a kernel that has crashed, hung, or is otherwise failing) will stop sending keep alive messages to CPU monitor 202 or may output a kernel panic signal to CPU 200.

During the operations of block 310, the system can fall back to tier-2 or tier-3 passthrough in response to monitoring circuit 202 detecting a kernel failure or panic. For example, when CPU monitoring circuit 202 has not received a keep alive message after an extended period of time exceeding a threshold time interval within which keep alive messages are expected to arrive (e.g., if the control CPU 200 detects one or more missing heartbeat signals) or if CPU 200 receives a kernel panic signal from kernel 226 via path 254, device 10 may fall back to the tier-2 high quality passthrough mode where only some auxiliary subsystems related to XR content generation are bypassed or to the tier-3 simple passthrough mode where all auxiliary algorithms related to XR content generation are bypassed. This example in which monitoring circuit 202 running on CPU 200 is being used to monitor the health of kernel 226 is illustrative. In other embodiments, any other trusted supervisor or firmware component running as part of component grouping 240 can be employed to detect when kernel driver 228 is failing or panicking.

While CPU monitoring circuit 202 can be used to monitor the health level of kernel 226, it is possible for CPU 200 to crash or hang due to a software bug or memory failure. Thus, during the operations of block 312, kernel driver 228 or other trusted supervisor in the kernel space or the application layer in component grouping 242 can be used as an additional (backup) level of detection to monitor the behavior of CPU 200. For example, CPU 200 (e.g., firmware or other health monitoring service running on CPU 200) can be configured to send keep alive messages (sometimes also referred to as heartbeat or status signals) to kernel driver 228 via path 256. The kernel driver monitoring keep alive messages from CPU 200 can be the same or different kernel driver 228 that is sending keep alive or kernel panic signals in the reverse direction via path 254. A properly functioning CPU 200 will send keep alive messages periodically to kernel driver 228, whereas a malfunctioning CPU 200 (e.g., a control CPU that has crashed, hung, or is otherwise failing) will stop sending keep alive messages to kernel driver 228 or may output a panic signal to kernel 226.

During the operations of block 314, the system can reboot itself (e.g., by rebooting CPU 200 and other associated processing circuitry) in response to kernel driver 228 detecting a CPU failure or panic. For example, when kernel driver 228 has not received a keep alive message after an extended period of time exceeding a threshold time interval within which keep alive messages are expected to arrive (e.g., if the kernel driver 228 detects one or more missing heartbeat signals) or if kernel 226 receives a panic signal from CPU 200 via path 256, CPU 200 and optionally the entire system of device 10 can be reboot. Since CPU 200 is primarily responsible for controlling the display pipeline for outputting the passthrough video feed, switching or falling back to the tier-2 or tier-3 passthrough mode might not be possible in this particular scenario when CPU 200 is failing.

The example of the operations of blocks 308 and 310 in which CPU monitoring circuit 202 is being used to detect a failure associated with kernel 226 is illustrative. Additionally or alternatively, the operations of block 316 include using CPU monitoring circuit 202 as an additional (backup) level of detection to monitor the behavior of IO processor(s) 204. For example, IO processor(s) 204 can be configured to send keep alive messages (sometimes also referred to as heartbeat or status signals) to monitoring circuit 202 via path 258. A properly functioning IO processor or image signal processor will send keep alive messages periodically to monitoring circuit 202, whereas a malfunctioning IO processor or ISP (e.g., an IO processor that has crashed, hung, or is otherwise failing) will stop sending keep alive messages to CPU monitor 202 or may output a panic signal to CPU 200.

During the operations of block 318, the system can fall back to tier-2 or tier-3 passthrough or can optionally reboot in response to monitoring circuit 202 detecting an IO processor failure or panic. For example, when CPU monitoring circuit 202 has not received a keep alive message after an extended period of time exceeding a threshold time interval within which keep alive messages are expected to arrive (e.g., if the control CPU 200 detects one or more missing heartbeat signals on path 258) or if CPU 200 receives a panic signal from IO processor(s) 204 via path 258, device 10 may fall back to the tier-2 high quality passthrough mode where only some auxiliary subsystems related to XR content generation are bypassed or to the tier-3 simple passthrough mode where all auxiliary algorithms related to XR content generation are bypassed. In situations where tier-2 or tier-3 passthrough mode are not possible, CPU 200 can direct one or more IO processor(s) 204 to reboot, can reboot itself, and/or can direct other circuitry in component grouping 240 and/or group 242 to reboot. This example in which monitoring circuit 202 running on CPU 200 is being used to monitor the health of IO processor(s) 204 is illustrative. In other embodiments, any other trusted supervisor or firmware component running as part of component grouping 240 can be employed to detect when IO processor(s) 204 are failing or panicking.

Additionally or alternatively, the operations of block 320 can include using the data transport controller components as an additional (backup) level of detection to monitor the liveliness of video frames between conveyed between data transport controller 230 and data transport controller 232. For example, the transmitting controller 232 can identify and count a number of repeated frames being transmitted over path 260. The number of repeated frames can be relayed to receiving controller 230. As other examples, data transport controller 232 can also detect missing frames, stale frames, invalid frames (e.g., frames with erroneous content), and/or other errors. If desired, data transport controller 232 can also be used to monitor a quality of service (QOS) metric. Monitoring frames in this way provides another way of detecting a critical failure within component grouping 242.

During the operations of block 322, data transport controller 230 can monitor the received video frames or can receive information relayed from data transport controller 232 indicating the number of repeated frames or of the presence of missing/stale/invalid frames. For example, if the number of repeated or missed frames exceeds a predetermined threshold, data transport controller 230 can assert an error signal Err to CPU 200 via path 262. The error signal can be received by CPU monitoring circuit 202. In response, CPU 200 can optionally fall back to the tier-2 high quality passthrough mode where only some auxiliary subsystems related to XR content generation are bypassed, fall back to the tier-3 simple passthrough mode where all auxiliary algorithms related to XR content generation are bypassed, reboot one or more portion(s) of device 10, trigger configurable actions or policies for restricting or otherwise limiting one or more subsystems related to a failing algorithm, or take other suitable action. At any point in time, if device 10 has been stuck in tier-2 or tier-3 passthrough mode for an extended period of time (e.g., if device 10 has been stuck in tier-2 or tier-3 mode for more than 5 seconds, for more than 10 seconds, for more than 30 seconds, for more than one minute, or for more than other predefined timing threshold), watchdog 62 may time out and reboot the entire system immediately (see operations of block 324). As an example, watchdog 62 can be used to detect whether CPU 200 has crashed, hung, or is otherwise failing. Additionally or alternatively, watchdog 62 can be configured to detect whether kernel driver 228 has crashed, hung, or is otherwise failing. Additionally or alternatively, watchdog 62 can be configured to detect whether scheduler 218 has crashed, hung, or is otherwise failing. In response to timing out, watchdog 62 may reboot the entire system or only portions of the system associated with the failing subsystem.

Performing hierarchical failure detection in this way can provide many different levels of backup detection. The operations of FIG. 8 are merely illustrative. In some embodiments, one or more of the described operations may be modified, replaced, or omitted. In some embodiments, one or more of the described operations may be performed in parallel. In some embodiments, additional processes may be added or inserted between the described operations. If desired, the order of certain operations may be reversed or altered and/or the timing of the described operations may be adjusted so that they occur at slightly different times. For example, if scheduler 218 is operating properly but kernel driver 228 is malfunctioning, block 306 can be skipped and block 310 can be performed to handle the kernel failure. As another example, if all subsystems appear to be functioning properly and all keep alive or heartbeat signals are intact but device 10 has been stuck in tier-2 or tier-3 passthrough mode for an extended period of time, then blocks 300-322 can be skipped and only block 324 can be performed to reboot at least a portion of the overall system. In other embodiments, the described operations may be distributed in a larger system.

The methods and operations described above in connection with FIGS. 1-8 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., the storage circuitry within control circuitry 20 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., one or more processors in control circuitry 20). The processing circuitry may include microprocessors, application processors, digital signal processors, central processing units (CPUs), application-specific integrated circuits with processing circuitry, or other processing circuitry.

A physical environment refers to a physical world that people can sense and/or interact with without the aid of an electronic device. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics.

Many different types of electronic systems can enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/ laptop computers.

The foregoing is merely illustrative and various modifications can be made to the described embodiments. The foregoing embodiments may be implemented individually or in any combination.

What is claimed is:

1. A method of operating an electronic device comprising:
with at least one image sensor, acquiring a video feed;
with a scheduler running in an application layer of the electronic device, obtaining a description of tasks to be performed by a plurality of applications running in the application layer;
determining whether to operate the electronic device in a first video passthrough mode or a second video passthrough mode based on the description of tasks;
while operating in the first video passthrough mode, displaying a passthrough video feed by modifying the video feed using information from the applications; and
while operating in the second video passthrough mode, displaying a passthrough video feed without modifying the video feed using the information from the applications.

2. The method of claim 1, wherein the applications comprise applications configured to generate extended reality content, the method further comprising:
in response to determining that the applications configured to generate the extended reality content is failing, triggering a configurable corrective action to mitigate the failure.

3. The method of claim 1, further comprising:
with a kernel driver running in a kernel layer of the electronic device, receiving keep alive messages from the scheduler; and in response to the kernel driver not receiving any keep alive messages from the scheduler for a period of time exceeding a threshold, switching the electronic device between the first video passthrough mode and the second video passthrough mode.

4. The method of claim 3, further comprising:
with a central processing unit (CPU) in the electronic device, receiving keep alive messages from the kernel driver; and
in response to the CPU not receiving any keep alive messages from the kernel driver for a period of time exceeding a threshold or in response to the CPU receiving a kernel panic signal from the kernel driver, switching the electronic device between the first video passthrough mode and the second video passthrough mode.

5. The method of claim 3, further comprising:
with the kernel driver, receiving keep alive messages from a central processing unit (CPU) in the electronic device; and
in response to the kernel driver not receiving any keep alive messages from the CPU for a period of time exceeding a threshold or in response to the kernel driver receiving a panic signal from the CPU, rebooting the electronic device.

6. The method of claim 4, further comprising:
with the CPU, receiving keep alive messages from at least one input-output processor in the electronic device; and
in response to the CPU not receiving any keep alive messages from the at least one input-output processor for a period of time exceeding a threshold or in response to the CPU receiving a panic signal from the at least one input-output processor, switching the electronic device between the first video passthrough mode and the second video passthrough mode.

7. The method of claim 4, further comprising:
with a first data transport controller, transmitting video frames to a second data transport controller; and
in response to the second data transport controller detecting an error in the transmitted video frames, asserting an error signal to alert the CPU.

8. The method of claim 1, further comprising:
determining whether to operate the electronic device in the first video passthrough mode, the second video passthrough mode, or a third video passthrough mode based on the description of tasks;
while operating in the third video passthrough mode, displaying a passthrough video feed by modifying the video feed using information from some of the applications while bypassing information from at least one failing application in the plurality of applications;
with a watchdog timer, monitoring whether the electronic device has been stuck in the second video passthrough mode or the third video passthrough mode for a period of time exceeding a threshold; and
in response to the watchdog timer expiring, performing a system reboot.

9. A method of operating an electronic device comprising:
with at least one image sensor, acquiring a video feed;
with a scheduler running in an application layer of the electronic device, obtaining a description of tasks to be performed by a plurality of applications running in the application layer by receiving compute graphs from the plurality of applications and analyzing the compute graphs to identify a condition of the applications; and determining whether to operate the electronic device in a first video passthrough mode or a second video passthrough mode based on the description of tasks.

10. The method of claim 9, wherein the applications comprise a gaze tracking application configured to execute a gaze tracking algorithm that tracks a user's gaze, and wherein the scheduler is configured to detect a failure of the gaze tracking algorithm by monitoring an output of a node in one of the compute graphs associated with the gaze tracking algorithm.

11. The method of claim 10, further comprising:

in response to detecting a failure of the gaze tracking algorithm, disabling dynamic foveation while operating in the first or second video passthrough mode.

12. The method of claim 9, wherein the applications comprise a head pose tracking application configured to execute a head pose tracking algorithm that tracks a user's head pose, and wherein the scheduler is configured to detect a failure of the head pose tracking algorithm by monitoring an output of a node in one of the compute graphs associated with the head pose tracking algorithm.

13. The method of claim 9, wherein the applications comprise a virtual content compositor configured to execute a virtual content compositor algorithm that generates composited virtual frames based on user tracking data, and wherein the scheduler is configured to detect a failure of the virtual content compositor algorithm by monitoring an output of a node in one of the compute graphs associated with the virtual content compositor algorithm.

14. The method of claim 9, wherein the applications comprise a graphics rendering application configured to execute a graphics rendering algorithm that generates virtual content, and wherein the scheduler is configured to detect a failure of the graphics rendering algorithm by monitoring an output of a node in one of the compute graphs associated with the graphics rendering algorithm.

15. A method of operating an electronic device comprising:

with at least one image sensor, acquiring a video feed;

with a scheduler running in an application layer of the electronic device, obtaining a description of tasks to be performed by a plurality of applications running in the application layer;

determining whether to operate the electronic device in a first video passthrough mode or a second video passthrough mode based on the description of tasks;

in response to determining that a first application in the plurality of applications is failing, triggering a first configurable corrective action; and in response to determining that a second application, different than the first application, in the plurality of applications is failing, triggering a second configurable corrective action different than the first configurable corrective action.

16. A method of operating an electronic device comprising:

with at least one image sensor, acquiring a video feed;

monitoring a condition of a first subsystem using a second subsystem;

determining whether to operate the electronic device in a first video passthrough mode or a second video passthrough mode based on the condition of the first subsystem as monitored by the second subsystem;

monitoring a condition of the second subsystem using a third subsystem; and determining whether to operate the electronic device in the first video passthrough mode or the second video passthrough mode based on the condition of the second subsystem as monitored by the third subsystem.

17. The method of claim 16, further comprising:

while operating in the first video passthrough mode, displaying a passthrough video feed by using processing circuitry to perform a processing function on the video feed from the at least one image sensor; and while operating in the second video passthrough mode, displaying a passthrough video feed based on the video feed from the at least one image sensor without performing the processing function.

18. The method of claim 16, further comprising:

monitoring a condition of the third subsystem using a fourth subsystem; and determining whether to operate the electronic device in the first video passthrough mode or the second video passthrough mode based on the condition of the third subsystem as monitored by the fourth subsystem.

19. The method of claim 16, wherein:

the second subsystem comprises a scheduling and resource management subsystem configured to run in an application layer of the electronic device, to receive compute graphs from a plurality of applications running in the application layer, and to analyze the compute graphs to monitor a condition of the applications; and the first subsystem comprises one of the plurality of applications selected from the group consisting of: a graphics renderer, a virtual content compositor, a gaze tracker, and a hands tracker.

20. The method of claim 16, wherein:

the second subsystem comprises a scheduling and resource management subsystem configured to run in an application layer of the electronic device, to receive compute graphs from a plurality of applications running in the application layer, and to analyze the compute graphs to monitor a condition of the applications; and the third subsystem comprises a kernel driver configured to run in a kernel layer of the electronic device and to receive keep alive messages from the scheduling the resource management subsystem to monitor the condition of the second subsystem.

21. The method of claim 16, wherein:

the second subsystem comprises a kernel driver configured to run in a kernel layer of the electronic device; and the third subsystem comprises a central processing unit (CPU) of the electronic device configured to receive keep alive messages or a kernel panic signal from the kernel driver to monitor the condition of the second subsystem.

22. The method of claim 16, wherein the third subsystem comprises a central processing unit (CPU) of the electronic device, the method further comprising:

monitoring a condition of the third subsystem using a fourth subsystem, wherein the fourth subsystem comprises a kernel driver configured to run in a kernel layer of the electronic device and configured to receive keep alive messages or a panic signal from the CPU to monitor the condition of the third subsystem; and rebooting at least the CPU based on the condition of the third subsystem as monitored by the fourth subsystem.

23. The method of claim 16, wherein:

the second subsystem comprises an input-output processor of the electronic device; and the third subsystem comprises a central processing unit (CPU) of the electronic device configured to receive keep alive messages or a panic signal from the input-output processor to monitor the condition of the second subsystem.

24. The method of claim 23, further comprising:

with a first data transport controller, transmitting video frames to a second data transport controller; and in response to the second data transport controller detecting an error in the transmitted video frames, asserting an error signal to alert the CPU.

25. The method of claim 16, further comprising:

in response to a watchdog timer expiring, performing a system reboot.

26. The method of claim 16, wherein monitoring a condition of the first subsystem comprises determining whether a number of repeating frames output from the first subsystem exceeds a threshold number of repeating frames, and wherein the threshold number of repeating frames is adjustable based on historical data.

27. An electronic device comprising:

at least one image sensor configured to acquire a video feed;

a first subsystem;

a second subsystem configured to monitor a condition of the first subsystem;

a third subsystem configured to monitor a condition of the second subsystem; and one or more displays configured to operate in a first video passthrough mode or a second video passthrough mode based on the condition of the first subsystem as monitored by the second subsystem and based on the condition of the second subsystem as monitored by the third subsystem, wherein in the first video passthrough mode, the one or more displays is configured to output a passthrough video feed by using processing circuitry to perform a processing function on the video feed from the at least one image sensor, and in the second video passthrough mode, the one or more displays is configured to output a passthrough video feed based on the video feed from the at least one image sensor without performing the processing function.

* * * * *